(12) United States Patent
Fujita et al.

(10) Patent No.: US 10,906,531 B2
(45) Date of Patent: Feb. 2, 2021

(54) INFORMATION PROCESSING DEVICE AND INFORMATION PROCESSING METHOD

(71) Applicant: SONY CORPORATION, Tokyo (JP)

(72) Inventors: Takuya Fujita, Kanagawa (JP); Kenta Kawamoto, Tokyo (JP); Shinji Igarashi, Saitama (JP); Atsushi Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 224 days.

(21) Appl. No.: 16/073,074

(22) PCT Filed: Jan. 27, 2017

(86) PCT No.: PCT/JP2017/002882
§ 371 (c)(1),
(2) Date: Jul. 26, 2018

(87) PCT Pub. No.: WO2017/138369
PCT Pub. Date: Aug. 17, 2017

(65) Prior Publication Data
US 2019/0039606 A1 Feb. 7, 2019

(30) Foreign Application Priority Data
Feb. 9, 2016 (JP) ................................. 2016-022326

(51) Int. Cl.
*B60W 30/06* (2006.01)
*B62D 15/02* (2006.01)
(Continued)

(52) U.S. Cl.
CPC ............. *B60W 30/06* (2013.01); *B60Q 9/002* (2013.01); *B60W 50/14* (2013.01);
(Continued)

(58) Field of Classification Search
CPC ................. B60W 30/06; B60W 50/14; B60W 2050/146; B60Q 9/002; B62D 15/0285; B62D 15/027; B60R 2300/806
See application file for complete search history.

(56) References Cited

U.S. PATENT DOCUMENTS 10,688,986 B2 * 6/2020 Shimizu et al. ...... B60W 30/06
2016/0284217 A1 * 9/2016 Lee et al. ........... B62D 15/0285
(Continued)

FOREIGN PATENT DOCUMENTS

JP 2005-075014 A 3/2005
JP 2013-241087 A 12/2013
(Continued)

OTHER PUBLICATIONS

International Search Report and Written Opinion of PCT Application No. PCT/JP2017/002882, dated Apr. 4, 2017, 07 pages of ISRWO.

(Continued)

*Primary Examiner* — Dale W Hilgendorf
(74) *Attorney, Agent, or Firm* — Chip Law Group

(57) ABSTRACT

The present technology relates to an information processing device that enables to perform parking according to a desired parking method, and relates to an information processing method, and a program. For respective modes corresponding to parking methods of automatic parking that automatically parks a vehicle, the information processing device calculates respective required times until the automatic parking is completed, and controls displaying of the
(Continued)

respective required times corresponding to the modes, thereby enabling to perform desired parking according to the required time until the automatic parking is completed. The present technology can be applied to, for example, an automatic parking system that is incorporated as a part of an automatic driving system with which a vehicle capable of performing automatic driving is provided.

9 Claims, 25 Drawing Sheets

(51) Int. Cl.
*B60Q 9/00* (2006.01)
*B60W 50/14* (2020.01)
(52) U.S. Cl.
CPC ....... *B62D 15/027* (2013.01); *B62D 15/0285* (2013.01); *B60R 2300/806* (2013.01); *B60W 2050/146* (2013.01)

(56) References Cited

U.S. PATENT DOCUMENTS

2018/0093663 A1* 4/2018 Kim et al. ............ B60W 30/06
2018/0244286 A1* 8/2018 Sakai et al. ........... B60W 30/06

FOREIGN PATENT DOCUMENTS

| JP | 2013-241088 A | 12/2013 |
| JP | 5803807 B2 | 11/2015 |
| WO | 2012/143033 A1 | 10/2012 |

OTHER PUBLICATIONS

Office Action for CN Patent Application No. 201780009576.6, dated Sep. 17, 2020, 5 pages of Office Action and 8 pages of English Translation.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/002882 filed on Jan. 27, 2017, which claims priority benefit of Japanese Patent Application No. JP 2016-022326 filed in the Japan Patent Office on Feb. 9, 2016. Each of the above-referenced applications is hereby incorporated herein by reference in its entirety.

TECHNICAL FIELD

The present technology relates to an information processing device, an information processing method, and a program, and in particular, relates to an information processing device that enables to perform parking according to a desired parking method, and relates to an information processing method, and a program.

BACKGROUND ART

In recent years, automatic parking systems for automatically performing parking such as parking in a garage and parallel parking are being studied.

For example, there is disclosed a parking assistance device that calculates a required time from the start of parking until the completion on the basis of a route from the start of parking until the completion, and a vehicle speed pattern of the route, and that displays the required time (refer to, for example, Patent Document 1).

CITATION LIST

Patent Document

Patent Document 1: Japanese Patent Application Laid-Open No. 2013-241087

SUMMARY OF THE INVENTION

Problems to be Solved by the Invention

Incidentally, in a case where there are a plurality of parking methods for automatic parking, it is necessary to select one parking method from among the plurality of parking methods, and thus a technology for enabling to perform parking according to a desired parking method has been required.

The present technology has been devised in consideration of such a situation, and enables to perform parking according to a desired parking method.

Solutions to Problems

An information processing device according to one aspect of the present technology includes: a required time calculation unit that calculates, for respective modes corresponding to parking methods of automatic parking that automatically parks a vehicle, respective required times until the automatic parking is completed; and a display control unit that controls displaying of the respective required times corresponding to the modes.

An information processing device according to one aspect of the present technology may be an independent device, or may be an internal block that forms one device. In addition, the information processing method, and the program, according to one aspect of the present technology are an information processing method, and a program, corresponding to the above-described information processing device according to one aspect of the present technology.

In the information processing device, the information processing method, and the program according to one aspect of the present technology, for respective modes corresponding to parking methods of automatic parking that automatically parks a vehicle, required times until the automatic parking is completed are calculated, and displaying of the required times corresponding to the modes is controlled.

Effects of the Invention

According to one aspect of the present technology, parking can be performed according to a desired parking method.

It should be noted that the effects described herein are not necessarily limited, and may be any one of the effects described in the present disclosure.

MODE FOR CARRYING OUT THE INVENTION

Figure 1:
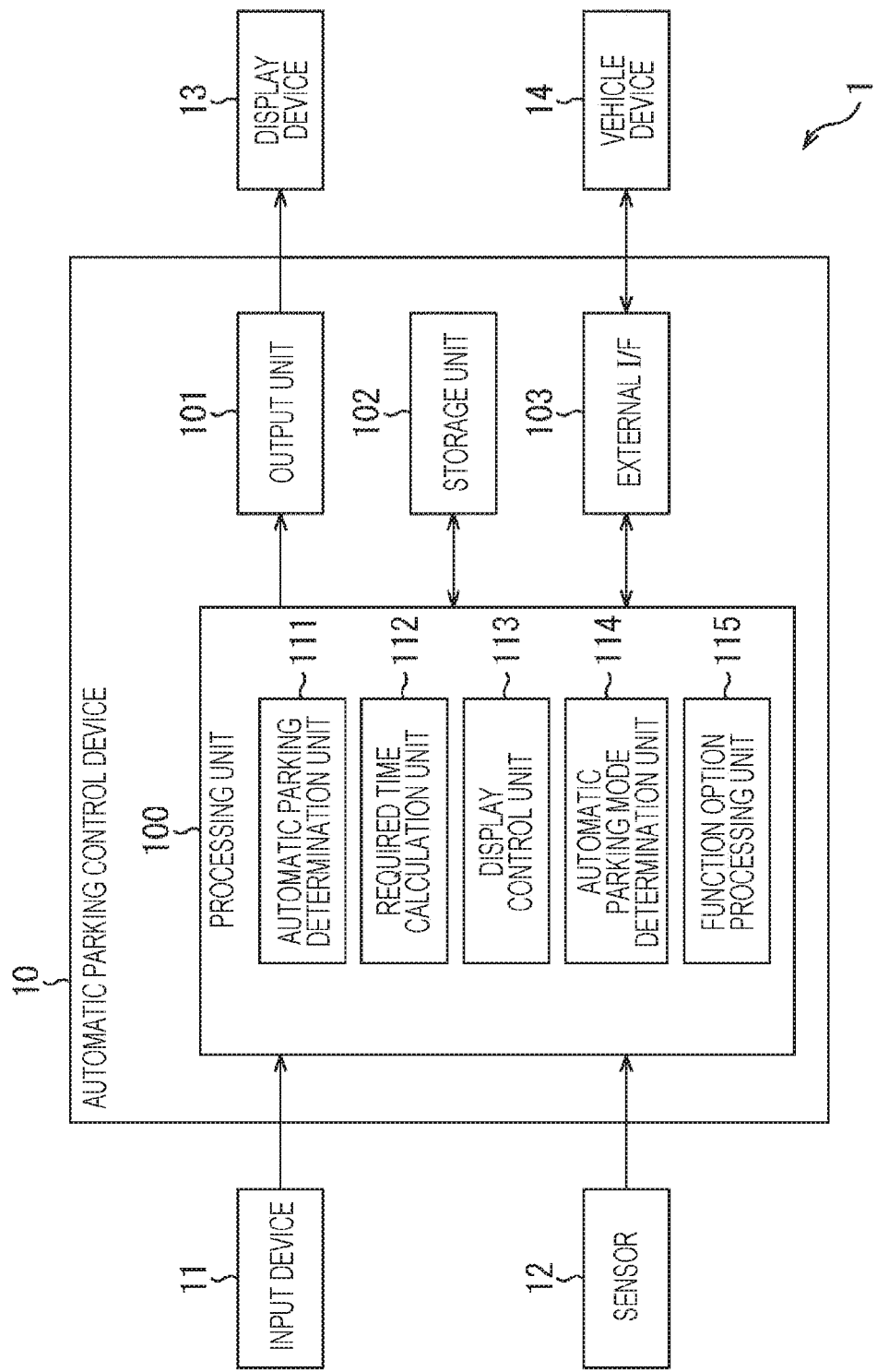
FIG. 1 is a diagram illustrating a configuration example of an automatic parking system to which the present technology is applied.

Embodiments of the present technology will be described below with reference to the drawings. It should be noted that explanations are made in the following order.

1. System configuration
2. Automatic parking preprocessing
3. Automatic parking processing
4. Remote parking processing
5. Learning processing
6. Configuration of computer
7. Vehicle control system <1. System Configuration>

(Configuration Example of Automatic Parking System)

FIG. 1 is a diagram illustrating a configuration example of an automatic parking system to which the present technology is applied.

The automatic parking system 1 is incorporated as a part of an automatic driving system with which a vehicle (for example, an automobile, an electric vehicle, personal mobility, etc.) capable of automatic driving is provided. In FIG. 1, the automatic parking system 1 includes an automatic parking control device 10, an input device 11, a sensor 12, a display device 13, and a vehicle device 14.

The automatic parking control device 10 controls the operation of each unit in order to perform automatic parking according to an automatic parking mode. It should be noted that automatic parking relates to a function of automatically controlling at least a part of an accelerator, a brake, a steering and the like of a vehicle without being instructed by a person (user) so as to park the vehicle. The embodiments of the present technology include both a state in which a user exists inside a vehicle, and a state in which the user exists outside the vehicle.

The input device 11 outputs an operation signal corresponding to the operation of the user to the automatic parking control device 10. The sensor 12 detects a signal required to perform processing related to automatic parking, and then outputs the detection signal to the automatic parking control device 10. The automatic parking control device 10 performs the processing related to automatic parking on the basis of the operation signal input from the input device 11, the detection signal input from the sensor 12, and the like. It should be noted that the input device 11 may be configured to detect an operation signal corresponding to user's operation for an information terminal device such as, for example, a smart phone and a portable telephone, and then to output the operation signal to the automatic parking control device 10.

The display device 13 displays information associated with automatic parking, the information being output from the automatic parking control device 10. The vehicle device 14 is a device with which a vehicle capable of automatic driving is equipped. The vehicle device 14 enables the vehicle to realize automatic driving by communicating data with the automatic parking control device 10.

The automatic parking control device 10 includes a processing unit 100, an output unit 101, a storage unit 102, and an external I/F 103. The processing unit 100 performs various processing related to automatic parking. The output unit 101 outputs information processed by the processing unit 100 to the display device 13. The storage unit 102 stores various kinds of data according to a request from the processing unit 100. The external I/F 103 is an interface that connects between the automatic parking control device 10 and the vehicle device 14.

The processing unit 100 includes an automatic parking determination unit 111, a required time calculation unit 112, a display control unit 113, an automatic parking mode determination unit 114, and a function option processing unit 115.

The automatic parking determination unit 111 determines, on the basis of automatic parking determination information, whether or not automatic parking can be started. Processing related to automatic parking is started according to a result of determination by the automatic parking determination unit 111. Incidentally, automatic parking determination information will be detailed later.

The required time calculation unit 112 calculates the time from the start of automatic parking until the completion (hereinafter referred to as "estimated required time") on the basis of estimated required time calculation information. In addition, the required time calculation unit 112 calculates the time from the present point of time until the completion of automatic parking (hereinafter referred to as "estimated remaining required time") on the basis of estimated remaining required time calculation information. Incidentally, the estimated required time calculation information and the estimated remaining required time calculation information will be detailed later.

The display control unit 113 causes various kinds of information processed by the processing unit 100 to be displayed on the display device 13 through the output unit 101. In addition, the display control unit 113 generates a screen that includes the estimated required time and the estimated remaining required time, which are calculated by the required time calculation unit 112, and then causes the screen to be displayed on the display device 13.

The automatic parking mode determination unit 114 determines an automatic parking mode on the basis of an operation signal from the input device 11. The automatic parking control device 10 performs processing related to automatic parking according to the automatic parking mode determined by the automatic parking mode determination unit 114. It should be noted that the automatic parking mode determination unit 114 may determine the automatic parking mode on the basis of not only the operation signal from the input device 11 but also information provided from the outside of the automatic parking control device 10 and information held in the automatic parking control device 10.

The function option processing unit 115 identifies options of functions that can be executed during automatic parking (hereinafter referred to as "currently executable function options") on the basis of function option identification information. Incidentally, the function option identification information will be detailed later. In addition, the display control unit 113 generates a screen that includes the currently executable function option identified by the function option processing unit 115, and then causes the screen to be displayed on the display device 13.

The automatic parking system 1 is configured as described above.

Incidentally, the automatic parking system 1 is incorporated as a part of the automatic driving system, and a vehicle capable of automatic driving is equipped with the vehicle device 14. However, the other components may be provided in the vehicle, or may be provided in a device that differs from the vehicle (for example, an information terminal device such as a smart phone, a portable telephone, and a tablet computer).

For example, all components that constitute the automatic parking system 1, in other words, the automatic parking control device 10, the input device 11, the sensor 12, the display device 13, and the vehicle device 14 can be provided in the vehicle. In addition, for example, the input device 11 and the display device 13 can be provided in an information terminal device such as a smart phone, whereas the other components, that is to say, the automatic parking control device 10, the sensor 12, and the vehicle device 14 can be provided in the vehicle. Moreover, for example, the automatic parking control device 10, the input device 11, and the display device 13 can be provided in an information terminal device such as a smart phone, whereas the other components, that is to say, the sensor 12 and the vehicle device 14 can be provided in the vehicle.

It should be noted that, for example, an image capturing unit 2410 and a vehicle outside information detection part 2420 shown in FIG. 24 described later can be used as the sensor 12. In addition, the vehicle device 14 corresponds to, for example, each control unit of a vehicle control system 2000 shown in FIG. 24 described later (for example, a drive system control unit 2100 and a vehicle state detection unit 2110, etc.).

<2. Automatic Parking Preprocessing>
(Flow of Automatic Parking Preprocessing)

Next, a flow of automatic parking preprocessing executed by the automatic parking system 1 shown in FIG. 1 will be described with reference to a flowchart shown in FIG. 2. However, this automatic parking preprocessing is executed while a vehicle (for example, an automobile, an electric vehicle, personal mobility, etc.) capable of automatic driving is traveling.

In a step S100, the processing unit 100 selects a parking lot that is a lot in which a vehicle that performs automatic parking can be parked. Here, this parking lot may be manually set according to the operation of a user, or may be automatically set by the processing unit 100. For example, the processing unit 100 is capable of automatically selecting a proper parking lot from among a plurality of parking lots by using various kinds of information such as the automatic parking determination information and the estimated required time calculation information described later.

In a step S101, the automatic parking determination unit 111 obtains automatic parking determination information used to determine automatic parking for the parking lot selected in the processing of the step S100. Here, for example, the information listed below can be obtained as the automatic parking determination information.

Automatic parking determination information
(A) Parking type
(B) Route distance to a target parking lot
(C) Width and length of the target parking lot
(D) Actual width and length of the target parking lot (an influence such as an obstacle is taken into consideration)
(E) Presence/absence of a vehicle that is stopping adjacently to the target parking lot
(F) Parking state of the vehicle that is stopping adjacently to the target parking lot
(G) State of a nearby visual field
(H) State of a nearby road surface
(I) Traffic situation (traffic jam situation)
(J) State of an own vehicle
(K) Route distance from a current position to a position of an entrance of a parking area (in a case where automatic parking is performed from a normal traveling state)
(L) Required waiting time for parking (in a case where automatic parking is performed from a normal traveling state)

It should be noted that as the above-described (A) parking type, for example, "parking in a garage" or "parallel parking", "forward parking" or "backward parking", "automatic parking while staying inside a vehicle" or "automatic parking after getting off the vehicle (remote parking)", or the like is selected.

In addition, as the automatic parking determination information, all pieces of information presented and listed in (A) to (L) may be obtained. However, only a part of the information may be obtained. Moreover, the information presented and listed in the (A) to (L) is an example of the automatic parking determination information. Thus, other information may be obtained so long as the information can be used as useful discrimination conditions when a determination is made as to whether or not automatic parking can be started.

In a step S102, on the basis of the automatic parking determination information obtained in the processing of the step S101, the automatic parking determination unit 111 determines whether or not automatic parking can be started for the parking lot selected in the processing of the step S100.

In other words, when automatic parking is determined, in accordance with a selection that can be made by a user, and various kinds of situations, a determination is made as to whether or not automatic parking can be performed. However, here, on the basis of at least one or more pieces of information among the pieces of information (A) to (L) presented and listed as the automatic parking determination information, a determination is made as to whether or not automatic parking can be performed.

Here, if one specific determination method is presented, there can be used a classifier in which output is whether or not automatic parking can be performed, and at least one piece of information among the pieces of information presented and list as the automatic parking determination information is feature quantity. As a technique of the classifier, publicly-known techniques such as Neural Network (NN), Support Vector Machine (SVM), and k-nearest neighbor algorithm (k-NN) can be used.

Such automatic parking determination processing is performed, and in a case where it is determined, in the step S102, that automatic parking cannot be started, the process proceeds to a step S109.

In the step S109, a determination is made as to whether or not to end traveling of the vehicle. In a step S109, in a case where it is determined that traveling of the vehicle is not ended, the process returns to the step S100, and the subsequent processings are repeated. Subsequently, the automatic parking determination information is obtained again by the processing in the step S101, and on the basis of the newly obtained automatic parking determination information, a determination is made again by the determination processing in the step S102 as to whether or not automatic parking can be started.

Meanwhile, in the step S102, in a case where it is determined that automatic parking can be started, the process proceeds to a step S103. In the step S103, the required time calculation unit 112 obtains estimated required time calculation information. Here, for example, the information listed below can be obtained as the estimated required time calculation information.

Estimated required time calculation information
(a) Parking type
(b) Route distance to a target parking lot
(c) Width and length of the target parking lot
(d) Actual width and length of the target parking lot (an influence such as an obstacle is taken into consideration)
(e) Presence/absence of a vehicle that is stopping adjacently to the target parking lot
(f) Parking state of the vehicle that is stopping adjacently to the target parking lot
(g) State of a nearby visual field
(h) State of a nearby road surface
(i) Traffic situation (congestion situation of a scheduled traveling route; more specifically, a traveling route until parking is predicted, and relates to information associated with vehicles, pedestrians and the like on the scheduled traveling route.)
(j) State of an own vehicle
(k) Route distance from a current position to a position of an entrance of a parking area (in a case where automatic parking is performed from a normal traveling state)
(l) Required waiting time for parking (in a case where automatic parking is performed from a normal traveling state)

It should be noted that as the above-described (a) parking type, for example, "parking in a garage" or "parallel parking", "forward parking" or "backward parking", "automatic parking while staying inside a vehicle" or "automatic parking after getting off the vehicle (remote parking)", or the like is selected.

In addition, the estimated required time calculation information includes the same piece of information as that included in the above-described automatic parking determination information. Therefore, it is not necessary to obtain the piece of information that has been obtained by the processing of the step S101, and that does not change time-sequentially, by the processing of the step S103 again.

Moreover, as the estimated required time calculation information, all pieces of information presented and listed in (a) to (l) may be obtained. However, only a part of the information may be obtained. Further, the information presented and listed in the (a) to (l) is an example of the estimated required time calculation information. Thus, other information may be obtained so long as the information can be used as useful parameters when the estimated required time is calculated.

In a step S104, the required time calculation unit 112 calculates the estimated required time on an automatic parking mode basis on the basis of the estimated required time calculation information obtained by the processing of the step S103.

In other words, when the estimated required time is calculated, in accordance with a selection that can be made by a user, and various kinds of situations, the time from the start of automatic parking until the completion (the estimated required time) is calculated. However, here, on the basis of at least one or more pieces of information among the pieces of information (a) to (l) presented and listed as the estimated required time calculation information, the estimated required time is calculated.

Here, if one specific calculation method is presented, there can be used a regression analysis in which the estimated required time is used as an objective variable, and at least one or more pieces of information among the pieces of information presented and listed as the estimated required time calculation information is used as an explanatory variable. As a technique of this regression analysis, for example, publicly-known techniques such as a neural network, a support vector regression (SVR), k-nearest neighbor algorithm, and a linear regression model can be used.

In a step S105, the display control unit 113 generates a screen that includes at least the estimated required time (on an automatic parking mode basis) calculated by the processing of the step S104, and an automatic parking start button used to instruct starting of automatic parking, and then causes the screen to be displayed on the display device 13 through the output unit 101. Here, as the screen that includes the estimated required time and the automatic parking start button, for example, a traveling-time automatic parking start screen and a selective automatic parking start screen can be displayed.

The traveling-time automatic parking start screen is a screen used to start automatic parking presented at the time of traveling, and includes at least the estimated required time and the automatic parking start button. A user checks this traveling-time automatic parking start screen, and in a case where the user accepts that automatic parking is performed in the estimated required time, the user operates the automatic parking start button. Incidentally, display examples of the traveling-time automatic parking start screen will be described later with reference to FIGS. 3 to 6.

The selective automatic parking start screen is a screen used to start automatic parking presented at the time of traveling, and includes estimated required times corresponding to a respective plurality of automatic parking modes. The user checks this selective automatic parking start screen, and in a case where the user accepts that automatic parking is performed in any of the estimated required times corresponding to the respective plurality of automatic parking modes, the user operates (selects) an automatic parking mode corresponding to the estimated required time. Incidentally, display examples of the selective automatic parking start screen will be described later with reference to FIGS. 7 to 11.

In a step S106, on the basis of an operation signal from the input device 11, a determination is made as to whether or not the automatic parking start button included in the screen (for example, the traveling-time automatic parking start screen or the selective automatic parking start screen) displayed by the processing of the step S105 has been operated.

In the step S106, in a case where it is determined that the automatic parking start button has not been operated, the process proceeds to the step S109. In the step S109, a determination is made as to whether or not to end traveling of the vehicle. Subsequently, in the step S109, in a case where it is determined that traveling of the vehicle is not ended, the process returns to the step S100, and the subsequent processings are repeated.

Meanwhile, in the step S106, in a case where it is determined that the automatic parking start button has been operated, the process proceeds to a step S107. In the step S107, the automatic parking mode determination unit 114 determines an automatic parking mode according to user's operation.

Here, for example, in a case where the selective automatic parking start screen is displayed by the processing of the step S105, a desired automatic parking mode that has been selected from among a plurality of automatic parking modes displayed in the selective automatic parking start screen is determined to be used. Incidentally, in the case of the traveling-time automatic parking start screen, estimated required time corresponding to a specific automatic parking mode is being displayed. Accordingly, when the estimated required time is calculated, an automatic parking mode is being selected, and therefore, for example, this selected automatic parking mode can be determined to be used.

In the step S107, after the determination of the automatic parking mode, the process proceeds to a step S108. In the step S108, automatic parking processing is performed according to the automatic parking mode determined by the processing of the step S107. This automatic parking processing will be detailed later with reference to a flowchart shown in FIG. 12.

Figure 2:
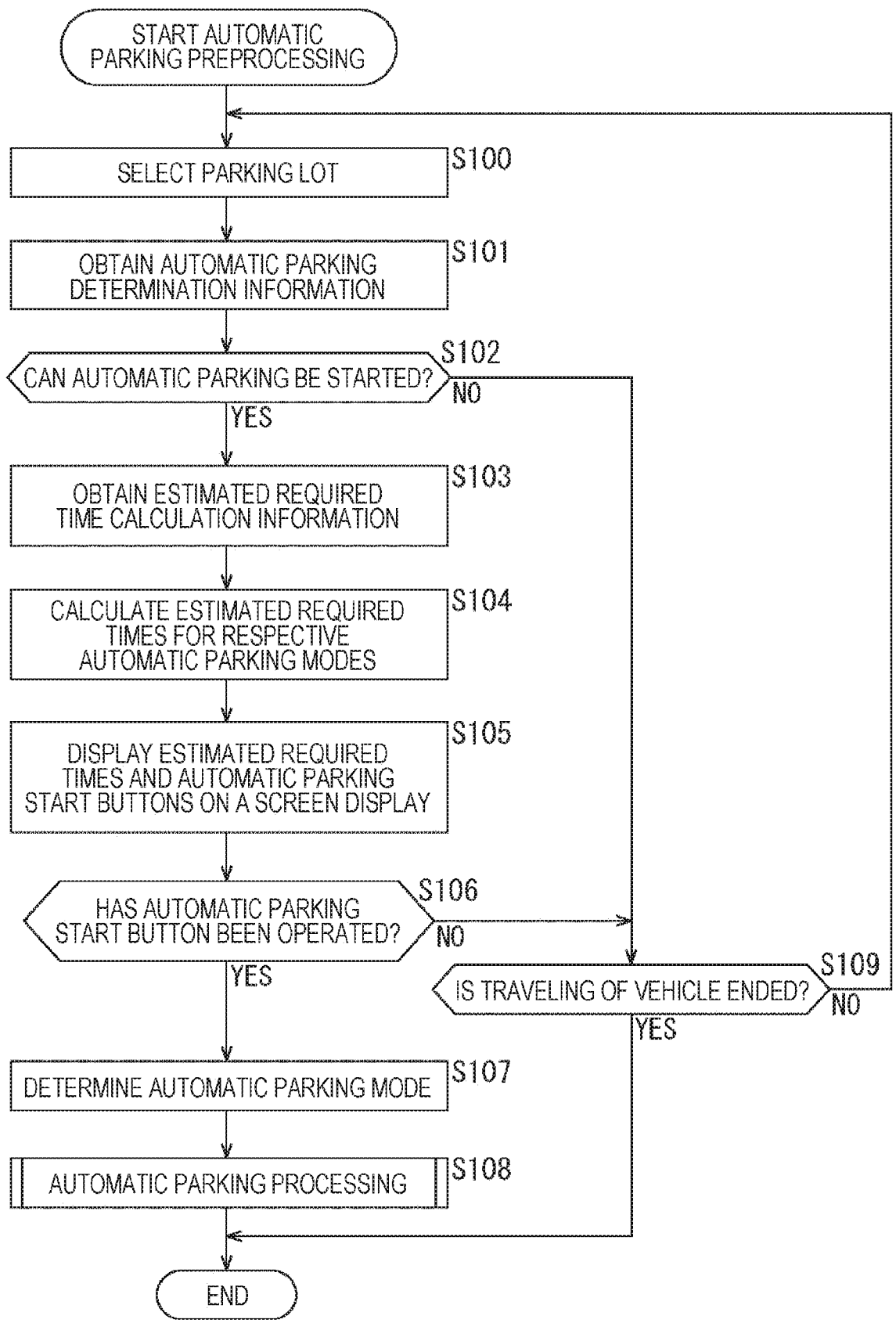
FIG. 2 is a flowchart illustrating a flow of automatic parking preprocessing.

After the processing of the step S108 ends, the automatic parking preprocessing shown in FIG. 2 ends. It should be noted that in the step S109, also in a case where it has been determined that traveling of the vehicle is ended, the automatic parking preprocessing shown in FIG. 2 ends.

The flow of the automatic parking preprocessing has been described above. In this automatic parking preprocessing, the estimated required time is calculated on an automatic parking mode basis, a screen (for example, the traveling-time automatic parking start screen, the selective automatic parking start screen, etc.) that includes the estimated required times corresponding to the respective automatic parking modes is displayed, an automatic parking mode is determined according to user's operation for the screen, and automatic parking processing corresponding to the determined automatic parking mode is executed.

(Display Example of Traveling-Time Automatic Parking Start Screen)

Here, display examples of the traveling-time automatic parking start screen displayed by the processing of the step S105 shown in FIG. 2 will be described with reference to FIGS. 3 to 6. An estimated required time corresponding to a specific automatic parking mode, and an automatic parking start button corresponding to the specific automatic parking mode, are displayed in this traveling-time automatic parking start screen.

(A) Display Example 1

Figure 3:
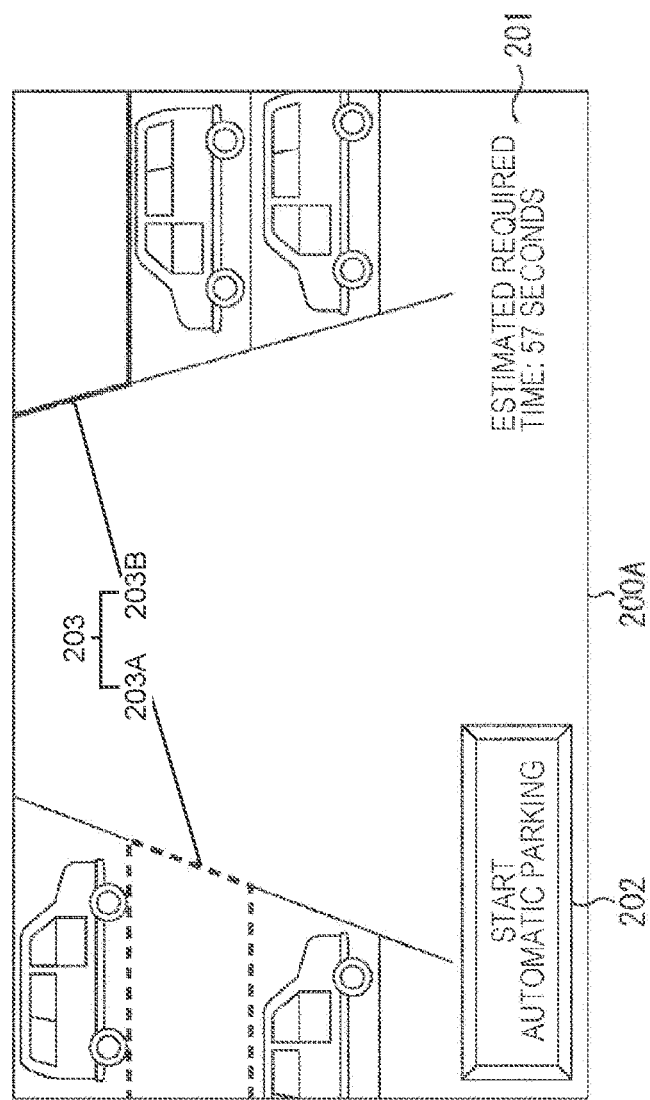
FIG. 3 is a drawing illustrating a display example of a traveling-time automatic parking start screen.

In a traveling-time automatic parking start screen 200A shown in FIG. 3, an estimated required time 201 from the start of automatic parking until the completion, an automatic parking start button 202 used to instruct starting of automatic parking, and parking lots 203 each showing a parkable lot are displayed in a superimposed manner on a captured image showing the inside of a parking area image-captured by the sensor 12. For example, the parkable lot is detected when a vehicle travels in the parking area in a parking lot search mode.

The estimated required time 201 corresponds to the estimated required time calculated by the processing of the step S104 shown in FIG. 2. In this display example, the parkable parking lots 203 include parking lots 203A and 203B in which no vehicle stops. However, for example, after the parking lot 203A is selected to start automatic parking until automatic parking to the parking lot 203A is completed, it is estimated that 57 seconds are required. It should be noted that a broken line of the parking lot 203A indicates that the parking lot is selected by the processing of the step S100 shown in FIG. 2.

Here, for example, the estimated required time 201 to be displayed corresponds to: a representative parking method (automatic parking mode) for the target parking lot 203A; a parking method (automatic parking mode) that is suitable for a user; or the like. Subsequently, the user checks the traveling-time automatic parking start screen 200A, and in a case where the user accepts that automatic parking is performed in approximately 57 seconds, the user operates the automatic parking start button 202. When this automatic parking start button 202 is operated, automatic parking to the parking lot 203A is started.

In this manner, by checking the traveling-time automatic parking start screen 200A shown in FIG. 3, the user is enabled to grasp the estimated required time taken to perform automatic parking, and is enabled to select behavior of: when the user accepts that automatic parking is performed in the estimated required time, selecting automatic parking; or when the user does not accept that automatic parking is performed in the estimated required time, performing manual parking by oneself without selecting automatic parking. This enables the user to properly perform decision-making, that is to say, leaving parking to the system, or performing parking by oneself.

(B) Display Example 2

Figure 4:
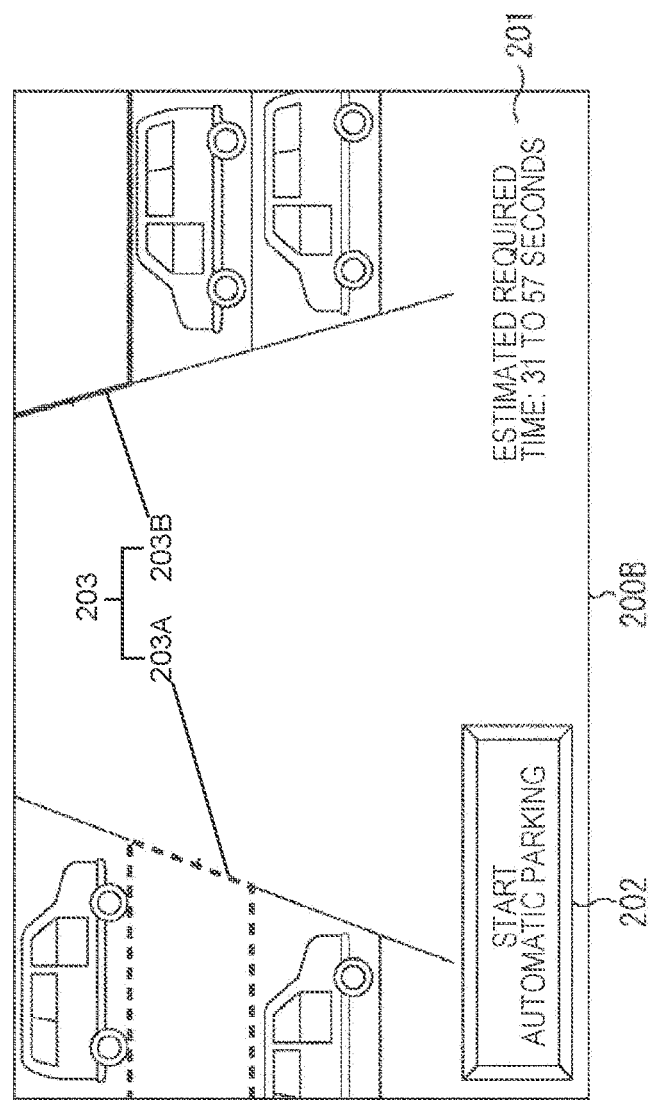
FIG. 4 is a drawing illustrating a display example of a traveling-time automatic parking start screen.

In a traveling-time automatic parking start screen 200B shown in FIG. 4, the estimated required time 201, the automatic parking start button 202, and the parking lots 203 are displayed in a superimposed manner on a captured image showing the inside of the parking area.

The estimated required time 201 corresponds to the estimated required time calculated by the processing of the step S104 shown in FIG. 2. However, in this display example, the estimated required time having a temporal width ranging from the estimated shortest time to the estimated longest time is displayed. In this display example, it is estimated that a period of time ranging from 31 to 57 seconds is required from the start of automatic parking until automatic parking to the parking lot 203A is completed.

Here, by merging estimated required times related to all parking methods (automatic parking modes) selectable for the target parking lot 203A, the estimated required time 201 having a temporal width ranging from the shortest time to the longest time is displayed. Alternatively, in a case where the prediction accuracy of predicting the existence, motion or the like of other vehicles is low, thus resulting in high uncertainty, the estimated required time 201 having a temporal width may be displayed on the basis of a plurality of calculation methods. Subsequently, the user checks the traveling-time automatic parking start screen 200B, and in a case where the user accepts that automatic parking is performed in a period of time ranging from 31 to 57 seconds, the user operates the automatic parking start button 202. When this automatic parking start button 202 is operated, automatic parking to the parking lot 203A is started.

In this manner, by checking the traveling-time automatic parking start screen 200B shown in FIG. 4, the user is enabled to grasp the estimated required time (the estimated required time taken to perform automatic parking) having a width to some extent, and is enabled to select behavior of: when the user accepts that automatic parking is performed within a range of the estimated required time having a width to some extent, selecting automatic parking; or when the user does not accept that automatic parking is performed within a range of the estimated required time having a width to some extent, performing manual parking by oneself. This enables the user to properly perform decision-making, that is to say, leaving parking to the system, or performing parking by oneself.

(C) Display Example 3

Figure 5:
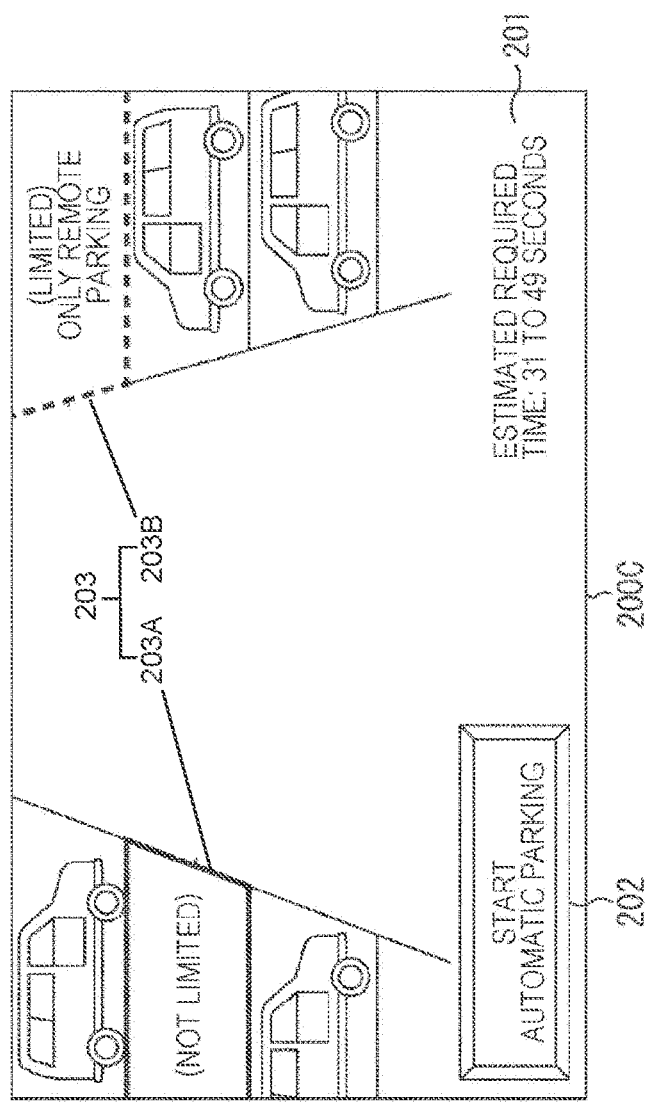
FIG. 5 is a drawing illustrating a display example of a traveling-time automatic parking start screen.

In a traveling-time automatic parking start screen 200C shown in FIG. 5, the estimated required time 201, the automatic parking start button 202, and the parking lots 203 are displayed in a superimposed manner on a captured image showing the inside of the parking area.

The estimated required time 201 corresponds to the estimated required time calculated by the processing of the step S104 shown in FIG. 2. However, in this display example, the estimated required time having a temporal width ranging from the estimated shortest time to the estimated longest time is displayed. In this display example, it is estimated that a period of time ranging from 31 to 49 seconds is required from the start of automatic parking until automatic parking to the parking lot 203B is completed.

In addition, in this display example, the parkable parking lots 203 include the parking lot 203A and the parking lot 203B, and the parking lot 203B is selected. However, in a case where automatic parking to the parking lot 203B is performed, a limitation that the automatic parking must be performed by remote parking is imposed. For example, an interval between vehicles that stop in the right and left adjacent parking lots is narrow in the parking lot 203B. Accordingly, in a case where automatic parking while staying inside a vehicle is started, for example, when there is a danger that it will be difficult to get off the vehicle after the completion of automatic parking, such a limitation can be imposed. Here, "(limited)" indicating that the limitation is imposed is displayed in the parking lot 203B in the traveling-time automatic parking start screen 200C.

It should be noted that in this display example, such a limitation is not imposed on the parking lot 203A, and therefore, in a case where the parking lot 203A is selected as a target of automatic parking, automatic parking can be performed without being limited to only remote parking. Here, "(not limited)" indicating that the limitation is not imposed is displayed in the parking lot 203A in the traveling-time automatic parking start screen 200C.

In addition, here, by merging estimated required times estimated on condition that remote parking is performed for the target parking lot 203B, the estimated required time 201 having a temporal width ranging from the shortest time to the longest time is displayed. Subsequently, the user checks the traveling-time automatic parking start screen 200C, and in a case where the user accepts that automatic parking by remote parking is performed in a period of time ranging from 31 to 49 seconds, the user operates the automatic parking start button 202. When this automatic parking start button 202 is operated, automatic parking to the parking lot 203B is started.

In this manner, by checking the traveling-time automatic parking start screen 200C shown in FIG. 5, the user is enabled to grasp the estimated required time (for example, the estimated required time taken to perform remote parking) having a width to some extent, and is enabled to select behavior of: when the user accepts that automatic parking is performed by a limited parking method (for example, remote parking) within a range of the estimated required time having a width to some extent, selecting automatic parking (for example, remote parking); or when the user does not accept that automatic parking is performed within a range of the estimated required time having a width to some extent, or when the user does not accept the limited parking method, performing manual parking by oneself. This enables the user to properly perform decision-making, that is to say, leaving parking to the system, or performing parking by oneself.

(D) Display Example 4

Figure 6:
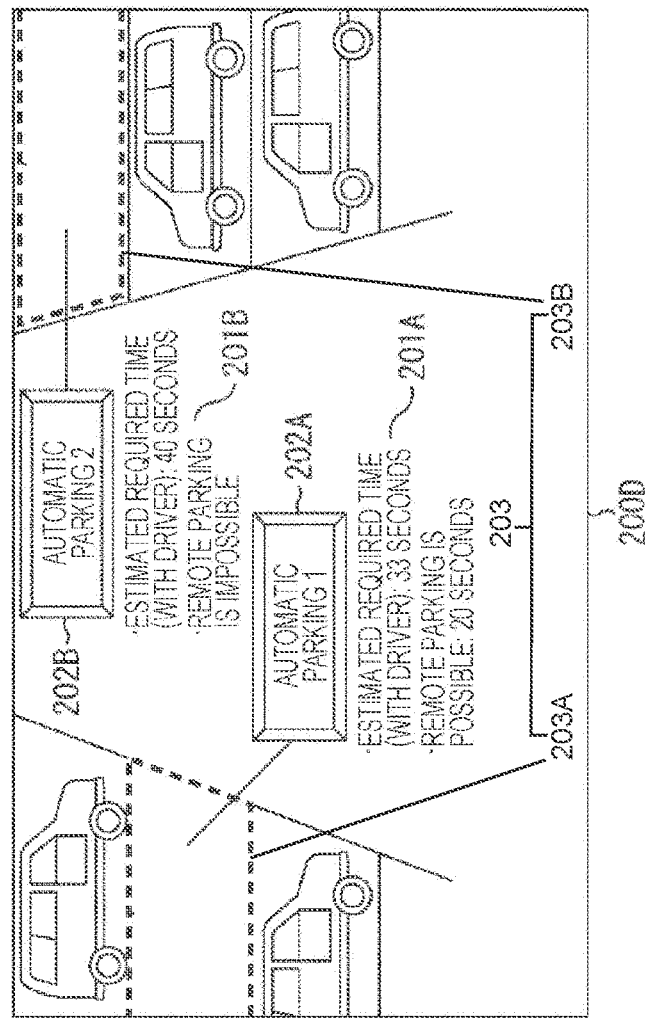
FIG. 6 is a drawing illustrating a display example of a traveling-time automatic parking start screen.

A traveling-time automatic parking start screen 200D in FIG. 6 shows an example in which in a case where the parkable parking lots 203 include a plurality of parking lots 203, the estimated required time 201A/201B and the automatic parking start button 202A/202B are displayed for each of the parking lots 203.

In this display example, in a case where the parkable parking lots 203 include the parking lot 203A and the parking lot 203B, the estimated required time 201A and the automatic parking start button 202A are displayed for the parking lot 203A, and the estimated required time 201B and the automatic parking start button 202B are displayed for the parking lot 203B.

Here, the estimated required time used when automatic parking is performed while the user (driver) stays inside the vehicle, and the estimated required time used when automatic parking (remote parking) is performed after the user (driver) gets off the vehicle, are displayed in the estimated required time 201A for the parking lot 203A. In this display example, it is estimated that 33 seconds are required from the start of automatic parking while staying inside the vehicle until automatic parking to the parking lot 203A is completed. In addition, it is estimated that 20 seconds are required from the start of remote parking after getting off the vehicle until the remote parking to the parking lot 203A is completed.

Meanwhile, the estimated required time used when automatic parking is performed while staying inside the vehicle, and a message indicating that remote parking after getting off the vehicle cannot be performed, are displayed in the estimated required time 201B for the parking lot 203B. In this display example, it is estimated that 40 seconds are required from the start of automatic parking while staying inside the vehicle until automatic parking to the parking lot 203B is completed. It should be noted that since remote parking cannot be performed for the parking lot 203B, the estimated required time for the remote parking is not displayed.

Subsequently, the user checks the traveling-time automatic parking start screen 200D, and in a case where the user accepts that automatic parking is performed for the parking lot 203A in approximately 33 seconds, the user operates the automatic parking start button 202A. When this automatic parking start button 202A is operated, automatic parking to the parking lot 203A is started. It should be noted that since remote parking can be performed for the parking lot 203A, in a case where the automatic parking start button 202A is operated, remote parking may be selectively started.

Meanwhile, the user checks the traveling-time automatic parking start screen 200D, and in a case where the user accepts that automatic parking is performed for the parking lot 203B in approximately 40 seconds, the user operates the automatic parking start button 202B. When this automatic parking start button 202B is operated, automatic parking to the parking lot 203B is started.

In this manner, by checking the traveling-time automatic parking start screen 200D shown in FIG. 6, the user is enabled to grasp the estimated required time taken to perform automatic parking for each of the parkable parking lots 203, and is enabled to select behavior of: when the user accepts that automatic parking is performed in the estimated required time, selecting automatic parking for any of the parking lots 203; or when the user does not accept that automatic parking is performed in the estimated required time for any of the parking lots 203, performing manual parking by oneself without selecting automatic parking. This enables the user to properly perform decision-making, that is to say, leaving parking to the system, or performing parking by oneself.

Incidentally, in the traveling-time automatic parking start screen 200D shown in FIG. 6, the estimated required time 201 and the automatic parking start button 202 are displayed for the plurality of parking lots 203. Therefore, for example, in the processing of the step S100 shown in FIG. 2, a plurality of parking lots are selected (prevent only a specific parking lot from being selected). However, in this case, processing of the step S100 shown in FIG. 2 may be skipped.

The display examples of the traveling-time automatic parking start screens have been described above. It should be noted that the above-described traveling-time automatic parking start screens 200A to 200D (FIGS. 3 to 6) are each examples of the automatic parking start screens displayed while traveling, and other display formats may be employed so long as estimated required time corresponding to a specific automatic parking mode, and an automatic parking start button used to instruct starting of automatic parking corresponding to the specific automatic parking mode, are displayed. In addition, the traveling-time automatic parking start screens 200A to 200D may be displayed not only during traveling of the vehicle but also while the vehicle is stopping.

(Display Example of Selective Automatic Parking Start Screen)

Next, display examples of the selective automatic parking start screen displayed by the processing of the step S105 shown in FIG. 2 will be described with reference to FIGS. 7 to 11. This selective automatic parking start screen displays automatic parking start buttons and estimated required times for respective automatic parking modes, the automatic parking start buttons being used to select the respective automatic parking modes, thereby instructing starting of automatic parking corresponding to the target automatic parking modes respectively.

(A) Display Example 1

Figure 7:
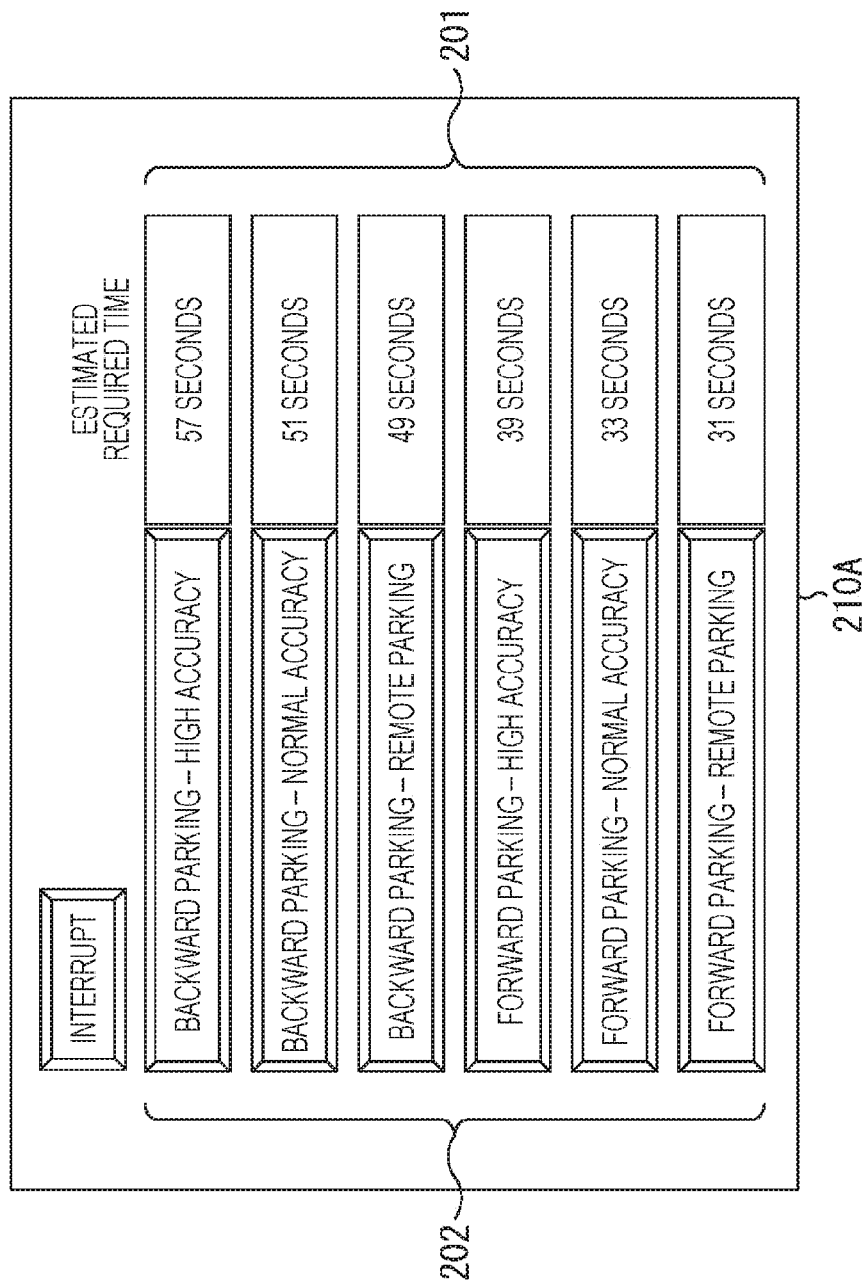
FIG. 7 is a drawing illustrating a display example of a selective automatic parking start screen.

In the selective automatic parking start screen 210A shown in FIG. 7, the estimated required times 201 are displayed respectively for six automatic parking modes that are a high-accuracy backward parking mode, a normal-accuracy backward parking mode, a remote-parking backward parking mode, a high-accuracy forward parking mode, a normal-accuracy forward parking mode, and a remote-parking forward parking mode. In addition, names corresponding to the respective automatic parking modes are displayed in the automatic parking start buttons 202.

The estimated required times 201 correspond to the estimated required times calculated by the processing of the step S104 shown in FIG. 2. However, here, the estimated required times are calculated for the respective automatic parking modes by using estimated required time calculation information corresponding to the target automatic parking modes.

For example, in a case where automatic parking is performed in the high-accuracy backward parking mode, it is estimated that 57 seconds are required from the start of automatic parking until the completion. In addition, in a case where automatic parking is performed in the normal-accuracy backward parking mode, it is estimated that 51 seconds are required, and in a case where automatic parking is performed in the remote-parking backward parking mode, it is estimated that 49 seconds are required.

In this manner, even in the case of the same backward parking, if high-accuracy backward parking is compared with normal-accuracy backward parking, high-accuracy backward parking takes longer time than normal-accuracy backward parking. In addition, the time required for automatic parking also differs between automatic parking performed while the user stays inside the vehicle and automatic parking (remote parking) performed after the user gets off the vehicle.

In addition, for example, in a case where automatic parking is performed in the high-accuracy forward parking mode, it is estimated that 39 seconds are required from the start of automatic parking until the completion. Moreover, in a case where automatic parking is performed in the normal-accuracy forward parking mode, it is estimated that 33 seconds are required, and in a case where automatic parking is performed in the remote-parking forward parking mode, it is estimated that 31 seconds are required.

In this manner, even in the case of the same forward parking, if high-accuracy forward parking is compared with normal-accuracy forward parking, high-accuracy forward parking takes longer time than normal-accuracy forward parking. In addition, the time required for automatic parking also differs between automatic parking performed while the user stays inside the vehicle and automatic parking (remote parking) performed after the user gets off the vehicle.

Further, even in the case of the same high-accuracy parking, if high-accuracy backward parking is compared with high-accuracy forward parking, high-accuracy backward parking takes longer time than high-accuracy forward parking. In addition, even in the case of the same normal-accuracy parking, if normal-accuracy backward parking is compared with normal-accuracy forward parking, normal-accuracy backward parking takes longer time than normal-accuracy forward parking. Moreover, even in the case of the same remote parking, if remote-parking backward parking is compared with remote-parking forward parking, remote-parking backward parking takes longer time than remote-parking forward parking.

Thus, by checking the selective automatic parking start screen 210A shown in FIG. 7, while the user grasps the estimated required times related to automatic parking for the respective automatic parking modes, when the user accepts that automatic parking is performed in the estimated required time corresponding to a desired automatic parking mode, the user has only to operate the automatic parking start button 202 corresponding to the desired automatic parking mode. As the result, automatic parking corresponding to the desired automatic parking mode is started.

For example, the user is allowed to select an arbitrary option from among six options (automatic parking modes) according to a current situation (for example, a degree of difficulty of parking, a user's own skill, how much the user hurries, etc.) or the like. More specifically, for example, in a case where the user has plenty of time and desires to park reliably even if it takes a long time, the user has only to operate the automatic parking start button 202 corresponding to the high-accuracy backward parking mode in which the estimated required time that is displayed is longer.

Incidentally, with respect to a difference between the high-accuracy parking mode and the normal-accuracy parking mode, for example, according to a desired interval (accuracy) between a vehicle to be parked and a white line of a parking lot or each of adjacent vehicles (front, back, right and left side vehicles), a parking mode having higher accuracy can be defined as the high-accuracy parking mode, and a parking mode having accuracy lower than that of the high-accuracy parking mode can be defined as a normal-accuracy parking mode. However, this difference between the parking modes is merely an example, and parking modes based on other criteria may be defined.

(B) Display Example 2

Figure 8:
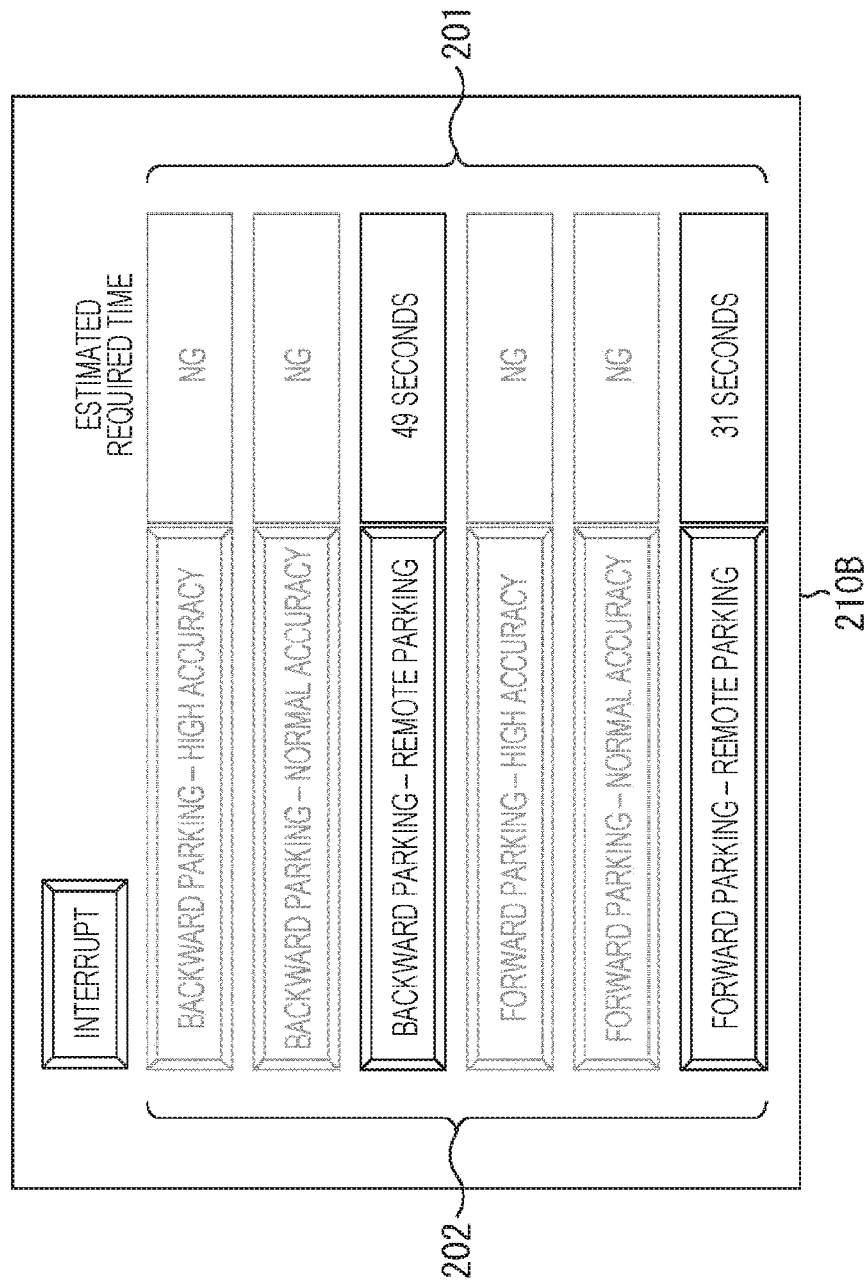
FIG. 8 is a drawing illustrating a display example of a selective automatic parking start screen.

In the selective automatic parking start screen 210B shown in FIG. 8, as with the above-described FIG. 7, estimated required times have been calculated respectively for the six automatic parking modes that are the high-accuracy backward parking mode, the normal-accuracy backward parking mode, the remote-parking backward parking mode, the high-accuracy forward parking mode, the normal-accuracy forward parking mode, and the remote-parking forward parking mode. However, in a case where selectable automatic parking modes (parking methods) are limited, unselectable options (automatic parking modes) are displayed by being grayed out.

For example, in the selective automatic parking start screen 210B shown in FIG. 8, the high-accuracy backward parking mode, the normal-accuracy backward parking mode, the high-accuracy forward parking mode, and the normal-accuracy forward parking mode among the six automatic parking modes are unselectable automatic parking modes, whereas the remote-parking backward parking mode and the remote-parking forward parking mode are selectable automatic parking modes.

Therefore, the estimated required times 201 are displayed as follows: in a case where automatic parking is performed in the remote-parking backward parking mode, 49 seconds are required; and in a case where automatic parking is performed in the remote-parking forward parking mode, 31 seconds are required. However, characters "NG" are displayed in the other automatic parking modes. In addition, although only remote parking is selectable as a selectable automatic parking mode, even in the case of the same remote parking, if high-accuracy backward parking is compared with high-accuracy forward parking, high-accuracy backward parking takes longer time than high-accuracy forward parking.

In this manner, by checking the selective automatic parking start screen 210B shown in FIG. 8, while the user grasps the estimated required times related to automatic parking for the respective automatic parking modes that are selectable automatic parking modes, and when the user accepts that automatic parking is performed in the estimated required time corresponding to a desired automatic parking mode, the user has only to operate the automatic parking start button 202 corresponding to the desired automatic parking mode. As the result, automatic parking corresponding to the desired automatic parking mode is started.

For example, the user is allowed to select an arbitrary option from between two options (automatic parking modes) corresponding to the selectable automatic parking modes according to a current situation (for example, a degree of difficulty of parking, a user's own skill, how much the user hurries, etc.) or the like. More specifically, for example, in a case where the user has plenty of time, the user has only to operate the automatic parking start button 202 corresponding to the remote-parking backward parking mode in which the estimated required time that is displayed is longer.

(C) Display Example 3

Figure 9:
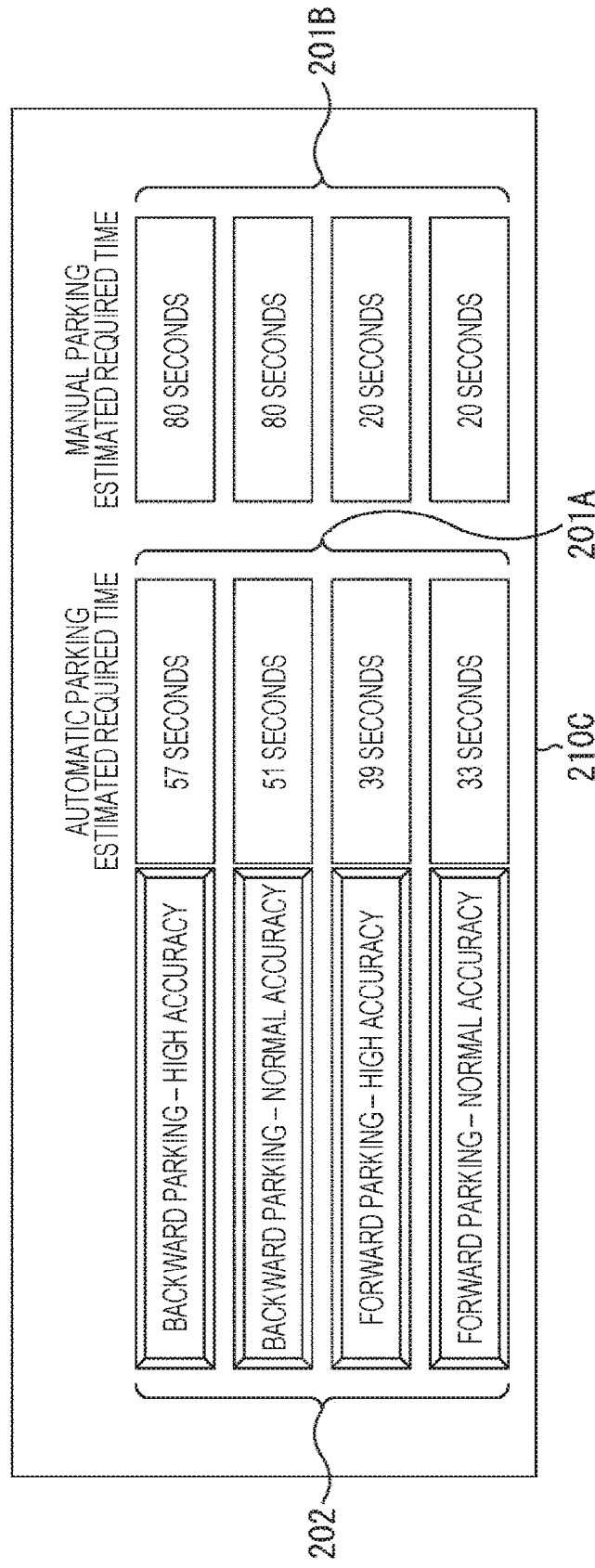
FIG. 9 is a drawing illustrating a display example of a selective automatic parking start screen.

In the selective automatic parking start screen 210C shown in FIG. 9, automatic parking estimated required times 201A and manual parking estimated required times 201B are displayed respectively for four automatic parking modes that are the high-accuracy backward parking mode, the normal-accuracy backward parking mode, the high-accuracy forward parking mode, and the normal-accuracy forward parking mode. In addition, names corresponding to the respective automatic parking modes are displayed in the automatic parking start buttons 202.

The automatic parking estimated required times 201A and the manual parking estimated required times 201B correspond to the estimated required times calculated by the processing of the step S104 shown in FIG. 2. However, here, by using estimated required time calculation information corresponding to the target automatic parking modes, estimated required times in the case of performing automatic parking, and estimated required times in the case of performing manual parking, are calculated for the respective automatic parking modes.

For example, in a case where automatic parking is performed in the high-accuracy backward parking mode, it is estimated that 57 seconds are required from the start of automatic parking until the completion. Meanwhile, in a case where the user performs high-accuracy manual backward parking, it is estimated that 80 seconds are required from the start of manual parking until the completion. In addition, in a case where automatic parking is performed in the normal-accuracy backward parking mode, it is estimated that 51 seconds are required. Meanwhile, in a case where the user performs normal-accuracy manual backward parking, it is estimated that 80 seconds are required.

Moreover, in a case where automatic parking is performed in the high-accuracy forward parking mode, it is estimated that 39 seconds are required. Meanwhile, in a case where the user performs high-accuracy manual forward parking, it is estimated that 20 seconds are required. Further, in a case where automatic parking is performed in the normal-accuracy forward parking mode, it is estimated that 33 seconds are required. Meanwhile, in a case where the user performs normal-accuracy manual forward parking, it is estimated that 20 seconds are required.

In other words, even in the case of the same parking method, if automatic parking is compared with manual parking, in the case of backward parking, manual parking takes longer time than automatic parking in this display example. In contrast, in the case of forward parking, automatic parking takes longer time than manual parking. It should be noted that at the time of manual parking, times that have actually been taken from the start of parking until the completion of the parking are recorded with the times classified by driver and similar parking condition, and the times required for manual parking are estimated and displayed on the basis of the recorded data.

Thus, by checking the selective automatic parking start screen 210C shown in FIG. 9, the user is enabled to grasp not only the estimated required times related to automatic parking, but also the estimated required times related to manual parking, for the respective automatic parking modes. Subsequently, even if the user takes the estimated required times related to manual parking into consideration, when the user accepts that automatic parking is performed in the estimated required time corresponding to a desired automatic parking mode, the user has only to operate the automatic parking start button 202 corresponding to the desired automatic parking mode. As the result, automatic parking corresponding to the desired automatic parking mode is started.

For example, the user is allowed to select an arbitrary option from among four options (automatic parking modes) according to a current situation (for example, a degree of difficulty of parking, a user's own skill, how much the user hurries, etc.) or the like. More specifically, for example, in a case where the user desires to park reliably even if it takes a long time, and when the user desires to select an automatic parking mode in which the selection of automatic parking enables to further shorten the time in comparison with manual parking, the user has only to operate the automatic parking start button 202 corresponding to the high-accuracy backward parking mode. In addition, for example, there is also assumed a case where the user hurries, and although parking seems to be relatively easy, estimated required times that are displayed are rather long, and consequently the user selects manual parking.

(D) Display Example 4

Figure 10:
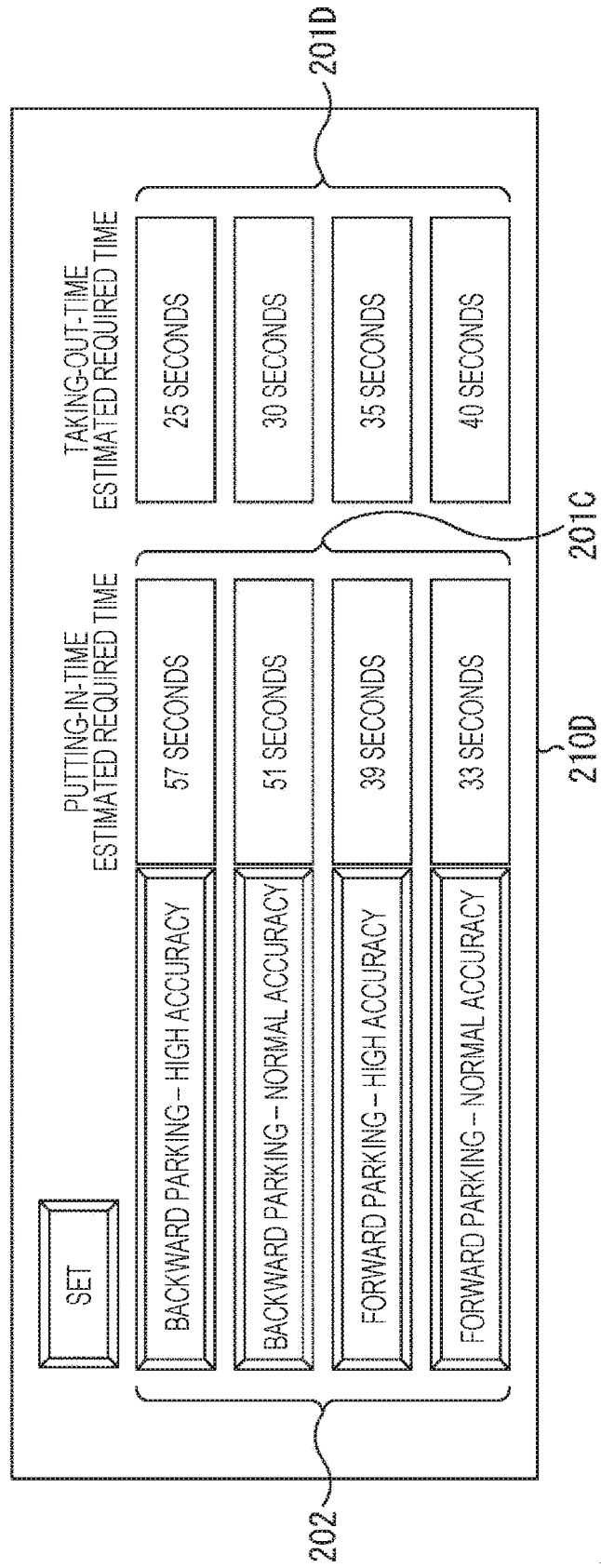
FIG. 10 is a drawing illustrating a display example of a selective automatic parking start screen.

In the selective automatic parking start screen 210D shown in FIG. 10, putting-in-time estimated required times 201C and taking-out-time estimated required times 201D are displayed respectively for four automatic parking modes that are the high-accuracy backward parking mode, the normal-accuracy backward parking mode, the high-accuracy forward parking mode, and the normal-accuracy forward parking mode. In addition, names corresponding to the respective automatic parking modes are displayed in the automatic parking start buttons 202.

The putting-in-time estimated required times 201C and the taking-out-time estimated required times 201D correspond to the estimated required times calculated by the processing of the step S104 shown in FIG. 2. However, here, by using estimated required time calculation information corresponding to the target automatic parking modes, the putting-in-time estimated required times from the start of automatic parking until the completion, and the taking-out-time estimated required times from the start of taking out until the completion, are calculated for the respective automatic parking modes.

For example, in a case where automatic parking is performed in the high-accuracy backward parking mode, it is estimated that 57 seconds are required from the start of automatic parking until the completion. Meanwhile, it is estimated that 25 seconds are required from the start of taking out a vehicle parked in the high-accuracy backward parking mode until the completion of taking out. In addition, in a case where automatic parking is performed in the normal-accuracy backward parking mode, it is estimated that 51 seconds are required. Meanwhile, in a case where a vehicle parked in the normal-accuracy backward parking mode is taken out, it is estimated that 30 seconds are required.

Moreover, in a case where automatic parking is performed in the high-accuracy forward parking mode, it is estimated that 39 seconds are required. Meanwhile, in a case where a vehicle parked in the high-accuracy forward parking mode is taken out, it is estimated that 35 seconds are required. Furthermore, in a case where automatic parking is performed in the normal-accuracy forward parking mode, it is estimated that 33 seconds are required. Meanwhile, in a case where a vehicle parked in the normal-accuracy forward parking mode is taken out, it is estimated that 40 seconds are required.

In other words, if the putting-in-time estimated required time is compared with the taking-out-time estimated required time on an automatic parking mode basis, in this display example, in the case of putting in a vehicle, backward parking takes longer time than forward parking. In contrast, in the case of taking out the vehicle, forward parking takes longer time than backward parking.

Thus, by checking the selective automatic parking start screen 210D shown in FIG. 10, the user is enabled to grasp not only the estimated required times required for putting in, but also the estimated required times required for taking out, for the respective automatic parking modes. Subsequently, even if the user takes the estimated required times required for putting in and taking out into consideration, when the user accepts that automatic parking is performed in the estimated required time corresponding to a desired automatic parking mode, the user has only to operate the automatic parking start button 202 corresponding to the desired automatic parking mode. As the result, automatic parking corresponding to the desired automatic parking mode is started.

For example, the user is allowed to select an arbitrary option from among four options (automatic parking modes) according to a current situation (for example, a degree of difficulty of parking, a user's own skill, how much the user hurries, etc.) or the like. More specifically, for example, even if it takes a long time to take out, in a case where the user desires to shorten the time from the start of automatic parking until the completion, the user has only to operate the automatic parking start button 202 corresponding to the normal-accuracy forward parking mode. Meanwhile, for example, in a case where the user has enough time until a next schedule, and therefore the user does not hurry at the time of parking (at the time of putting in) but needs to hurry at the time of taking out, the user has only to operate the automatic parking start button 202 corresponding to the high-accuracy backward parking mode in which the taking-out-time estimated required time is shorter.

Incidentally, with respect to a calculation method for calculating the taking-out-time estimated required time, as with the calculation method for calculating the estimated required time at the time of automatic parking (at the time of putting in), the estimated required time required at the time of taking out is calculated in accordance with a selection that can be made by the user, and various kinds of situations. However, in addition to parameters used at the time of automatic parking (at the time of putting in), for example, a selection that can be made by the user at the time of taking out may be added. The selection that can be made by the user at the time of taking out includes, for example, a position, direction and the like of an own vehicle at the time of the completion of taking out.

In addition, differently from at the time of parking (at the time of putting in), a situation in the future needs to be taken into consideration at the time of taking out. Here, as the simplest realization method, there is a method in which the estimated required time at the time of taking out is calculated on the assumption that a situation at the time of parking continues just as it is in the future too. Moreover, as a realization method with higher accuracy, there is a method in which average situation information by condition is held on a parking area basis, and the information is then used. The conditions described here include, for example, day of the week (or weekday, holiday), time zone, weather (fine, cloudy, rain, snow, etc.), temperature, surrounding circumstances (for example, presence/absence of event opening, presence/absence of traffic restriction, traffic congestion information, situation of public transportation), and the like.

(E) Display Example 5

Figure 11:
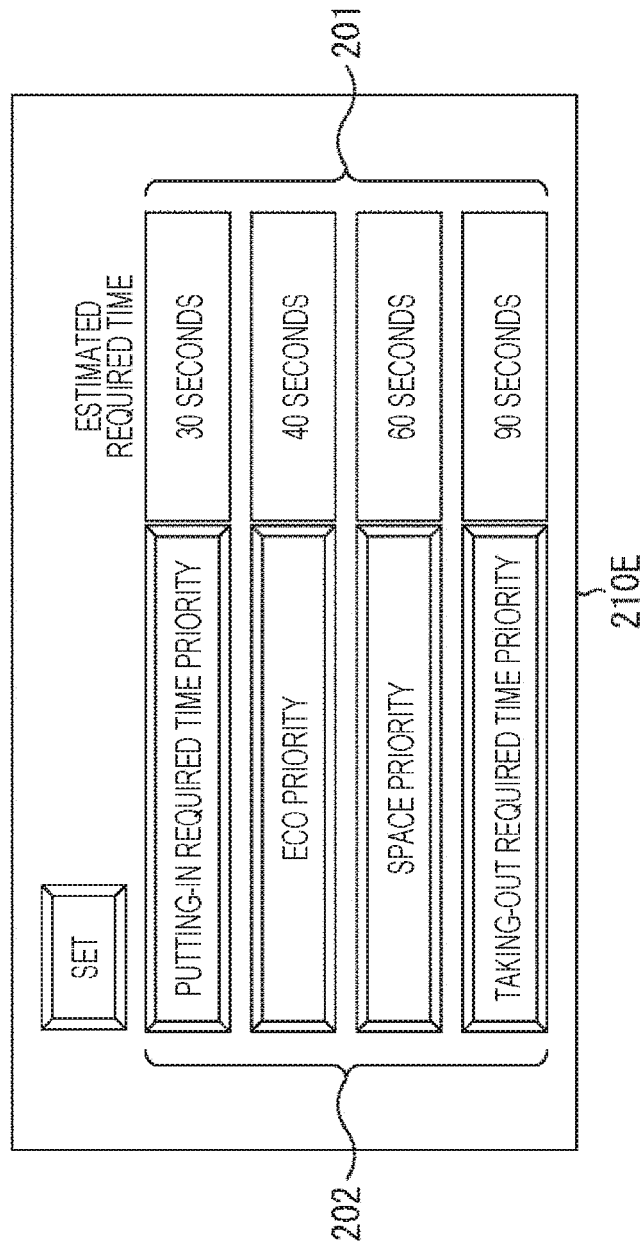
FIG. 11 is a drawing illustrating a display example of a selective automatic parking start screen.

In the selective automatic parking start screen 210E shown in FIG. 11, estimated required times 201 are displayed respectively for four automatic parking modes that are a putting-in required time priority parking mode, an eco-priority parking mode, a space priority parking mode, and a taking-out required time priority parking mode. In addition, names corresponding to the respective automatic parking modes are displayed in the automatic parking start buttons 202.

The estimated required times 201 correspond to the estimated required times calculated by the processing of the step S104 shown in FIG. 2. However, here, the estimated required times are calculated for the respective automatic parking modes by using estimated required time calculation information corresponding to the target automatic parking modes.

For example, in a case where automatic parking is performed in the putting-in required time priority parking mode in such a manner that the time taken at the time of putting in is shortened, it is estimated that 30 seconds are required from the start of automatic parking until the completion. In addition, in a case where automatic parking is performed in the eco-priority parking mode in such a manner that, for example, the discharge amount of carbon dioxide ($CO_2$) be reduced, it is estimated that 40 seconds are required from the start of automatic parking until the completion. Incidentally, in the eco-priority parking mode, automatic parking that takes the environment into consideration is performed. For example, automatic parking is performed in such a manner that fuel consumption and battery consumption are reduced.

Moreover, in a case where automatic parking is performed in the space priority parking mode in such a manner that a predetermined space is ensured after parking, it is estimated that 60 seconds are required from the start of automatic parking until the completion. Further, in a case where automatic parking is performed in the taking-out required time priority parking mode in such a manner that the time taken at the time of taking out is shortened, it is estimated that 90 seconds are required from the start of automatic parking until the completion.

In other words, if the estimated required times are compared among the automatic parking modes, in this display example, the times from the start of automatic parking until the completion differ depending on the priority given to each automatic parking mode (among requirements related to automatic parking, a requirement (specific requirement) to which a priority is given).

By checking the selective automatic parking start screen 210E shown in FIG. 11, the user is enabled to grasp the estimated required times corresponding to the priorities for the respective automatic parking modes. Subsequently, even if the user takes the estimated required times corresponding to the priorities into consideration, when the user accepts that automatic parking is performed in the estimated required time corresponding to a desired automatic parking mode, the user has only to operate the automatic parking start button 202 corresponding to the desired automatic parking mode. As the result, automatic parking corresponding to the desired automatic parking mode is started.

For example, the user is allowed to select an arbitrary option from among four options (automatic parking modes) according to a current situation (for example, a degree of difficulty of parking, a user's own skill, how much the user hurries, etc.) or the like. More specifically, for example, in the case of a user having a high consciousness for the environment, the user has only to operate the automatic parking start button 202 corresponding to the eco-priority parking mode.

The display examples of the selective automatic parking start screens have been described above. It should be noted that the above-described selective automatic parking start screens 210A to 210E (FIGS. 7 to 11) are each examples of the automatic parking start screens displayed while traveling, and other display formats may be employed so long as the estimated required times are displayed for the respective automatic parking modes, and so long as an automatic parking mode is selected to display an automatic parking start button used to instruct starting of automatic parking corresponding to the target automatic parking mode.

For example, as other display formats, a degree of safety, or the like, may be calculated for presentation, the degree of safety indicating a degree that a trouble is hard to occur from parking (putting in) until taking out. Here, for example, a possibility that, for example, when another vehicle parks in a parking section adjacent to a parking lot of the own vehicle or the other vehicle is taken out from the adjacent parking section, the other vehicle will come in contact with the own vehicle is mentioned as a trouble. More specifically, for example, in a case where another vehicle in the adjacent parking lot is parked off the parking lot, the handle is left being turned, or the another vehicle is parked forward, it can be said that the degree of safety is low In addition, as other display formats, there are easiness of manual parking (putting in), easiness of manual taking out, and the like.

Moreover, in the above description, the traveling-time automatic parking start screen 200 (the traveling-time automatic parking start screens 200A to 200D in FIGS. 3 to 6) and the selective automatic parking start screen 210 (the selective automatic parking start screens 210A to 210E in FIGS. 7 to 11) have been described as independent and separate screens. However, in a case where the traveling-time automatic parking start screen 200 is displayed, when the automatic parking start button 202 (FIGS. 3 to 6) is operated, the traveling-time automatic parking start screen 200 may be changed to the selective automatic parking start screen 210. In other words, in this case, the process flows as follows: after it is determined, by using the traveling-time automatic parking start screen 200, that automatic parking is performed, an automatic parking mode is determined by using the selective automatic parking start screen 210.

Furthermore, with respect to the timing in which the estimated required time until the completion of automatic parking is displayed, the estimated required time can be displayed, for example, at the time of normal travelling, at an entrance of the parking area, at the time of traveling in the parking area, when a mode in which automatic parking is performed is entered, when a button related to automatic parking is operated, or the like.

<3. Automatic Parking Processing>
(Flow of Automatic Parking Processing)

A flow of automatic parking processing corresponding to the processing of the step S108 shown in FIG. 2 will be described with reference to a flowchart shown in FIG. 12.

In a step S141, automatic parking is started by a vehicle with which the automatic parking system 1 (FIG. 1) is equipped.

In a step S142, the required time calculation unit 112 obtains estimated remaining required time calculation information. Here, for example, the information listed below can be obtained as the estimated remaining required time calculation information.

Estimated remaining required time calculation information
(a) Parking type
(b) Route distance to a target parking lot
(c) Width and length of the target parking lot
(d) Actual width and length of the target parking lot (an influence such as an obstacle is taken into consideration)
(e) Presence/absence of a vehicle that is stopping adjacently to the target parking lot
(f) Parking state of the vehicle that is stopping adjacently to the target parking lot
(g) State of a nearby visual field
(h) State of a nearby road surface It should be noted that as the above-described (a) parking type, for example, "parking in a garage" or "parallel parking", "forward parking" or "backward parking", "automatic parking while staying inside a vehicle" or "automatic parking after getting off the vehicle (remote parking)", or the like is selected.

In addition, the estimated remaining required time calculation information includes the same piece of information as that included in the above-described estimated required time calculation information. Therefore, it is not necessary to obtain the piece of information that has been obtained by the processing of the step S103 shown in FIG. 2, and that does not change time-sequentially, by the processing of the step S142 again.

Moreover, as the estimated remaining required time calculation information, all pieces of information presented and listed in (a) to (h) may be obtained. However, only a part of the information may be obtained. Further, the information presented and listed in the (a) to (h) is an example of the estimated remaining required time calculation information. Thus, other information may be obtained so long as the information can be used as useful parameters when the estimated remaining required time is calculated.

In a step S143, the required time calculation unit 112 calculates the estimated remaining required time on an automatic parking mode basis on the basis of the estimated remaining required time calculation information obtained by the processing of the step S142.

In other words, when the estimated remaining required time is calculated, in accordance with a selection that can be made by a user, and various kinds of situations, the time from the present point of time until the completion of automatic parking (the estimated remaining required time) is calculated. However, here, on the basis of at least one or more pieces of information among the pieces of information (a) to (h) presented and listed as the estimated remaining required time calculation information, the estimated remaining required time is calculated.

If one specific calculation method is presented, there can be used a regression analysis in which the required time is used as an objective variable, and at least one or more pieces of information among the pieces of information presented and listed as the estimated remaining required time calculation information is used as an explanatory variable. As a technique of this regression analysis, for example, publicly-known techniques such as a neural network, a support vector regression, k-nearest neighbor algorithm, and a linear regression model can be used.

In a step S144, the function option processing unit 115 obtains function option identification information used to identify a currently executable function option. In addition, in a step S145, the function option processing unit 115 identifies a currently executable function option on the basis of the function option identification information obtained by the processing of the step S144.

Incidentally, when options (parking methods) of executable functions at the present point of time during automatic parking are identified, information that can be used as a useful parameter (for example, information indicating whether or not a target vehicle corresponds to high-accuracy automatic parking/remote parking, and the like) is used as this function option identification information, the options including, for example, normal accuracy or high accuracy automatic parking, remote parking, manual parking, and the like. However, the function option identification information may include the same piece of information as the obtained piece of information such as the estimated remaining required time calculation information. In this case, the piece of information that does not change time-sequentially need not be obtained again.

In a step S146, the display control unit 113 generates a screen that includes at least the estimated remaining required time calculated by the processing of the step S143, and the currently executable function options identified by the processing of the step S145, and then causes the screen to be displayed on the display device 13 through the output unit 101. Here, as a screen that includes the estimated remaining required time and the currently executable function options, for example, an automatic-parking-time mode change screen can be displayed.

The automatic-parking-time mode change screen is a screen used to change an automatic parking mode that is presented at the time of automatic parking, and is a screen that includes the estimated remaining required time and the currently executable function options. The user checks this automatic-parking-time mode change screen, and in a case where the user accepts that the automatic parking mode is changed to an automatic parking mode corresponding to the currently executable function option, the user operates a target function option button. Incidentally, display examples of the automatic-parking-time mode change screen will be described later with reference to FIGS. 16 to 18.

In addition, during automatic parking, an estimated remaining required time presentation screen that includes the estimated remaining required time can be displayed together with, for example, a captured image showing the inside of the parking area. Incidentally, display examples of the estimated remaining required time presentation screen will be described later with reference to FIGS. 13 to 15. However, the automatic-parking-time mode change screen and the estimated remaining required time presentation screen can be changed to each other.

In a step S147, on the basis of an operation signal from the input device 11, a determination is made as to whether or not a function option button included in the screen (for example, the automatic-parking-time mode change screen) displayed by the processing of the step S146 has been operated.

In the step S147, in a case where it is determined that the function option button has not been operated, the process proceeds to a step S148. In the step S148, vehicle operation for automatic parking is executed. When the processing of the step S148 ends, the process proceeds to a step S149.

In the step S149, a determination is made as to whether or not automatic parking has been completed. In the step S149, in a case where it is determined that automatic parking has not been completed, the process returns to the step S142, and subsequent processing is executed. In addition, by repeating the processing in the steps S142 to S149, the estimated remaining required time presentation screen and the automatic-parking-time mode change screen are also updated.

Moreover, in the step S147, in a case where it is determined that the function option button has been operated, the process proceeds to a step S150. In the step S150, the function corresponding to the function option selected by the processing of the step S147 is executed.

More specifically, here, an automatic parking mode (parking mode) corresponding to a function option button selected by the user is determined by the automatic parking mode determination unit 114, and parking (for example, automatic parking processing) corresponding to the determined (changed) automatic parking mode (parking mode) is performed. However, in this case, the automatic parking mode (parking mode) includes not only a mode related to automatic parking, but also a mode for switching from automatic parking to manual parking. By switching the automatic parking mode, for example, accuracy of automatic parking is switched, or switching from automatic parking to manual parking is performed.

When the processing of the step S150 ends, the process proceeds to the step S149. In the step S149, in a case where it is determined that automatic parking has not been completed, the process returns to the step S142, and subsequent processing is executed. Meanwhile, in the step S149, in a case where it is determined that automatic parking has been completed, the automatic parking processing shown in FIG. 12 ends, and the process returns to the step S108 shown in FIG. 2.

The flow of the automatic parking processing has been described above. In this automatic parking processing, the estimated remaining required time is calculated on an automatic parking mode basis, and a screen (for example, the estimated remaining required time presentation screen) that includes the estimated remaining required times for respective automatic parking modes is displayed. In addition, a currently executable function option is identified, and a screen (for example, the automatic-parking-time mode change screen) that includes the currently executable function option is displayed. According to the operation of the user for the screen, the automatic parking mode (parking mode) is switched, and parking corresponding to the automatic parking mode (parking mode) after switching is performed.

(Display Example of Estimated Remaining Required Time Presentation Screen)

Here, display examples of the estimated remaining required time presentation screen displayed during automatic parking (for example, the processing of the step S146 shown in FIG. 12, etc.) in the automatic parking processing shown in FIG. 12 will be described with reference to FIGS. 13 to 15. The estimated remaining required time corresponding to the automatic parking mode selected at the present point of time is displayed in this estimated remaining required time presentation screen.

(A) Display Example 1

Figure 12:
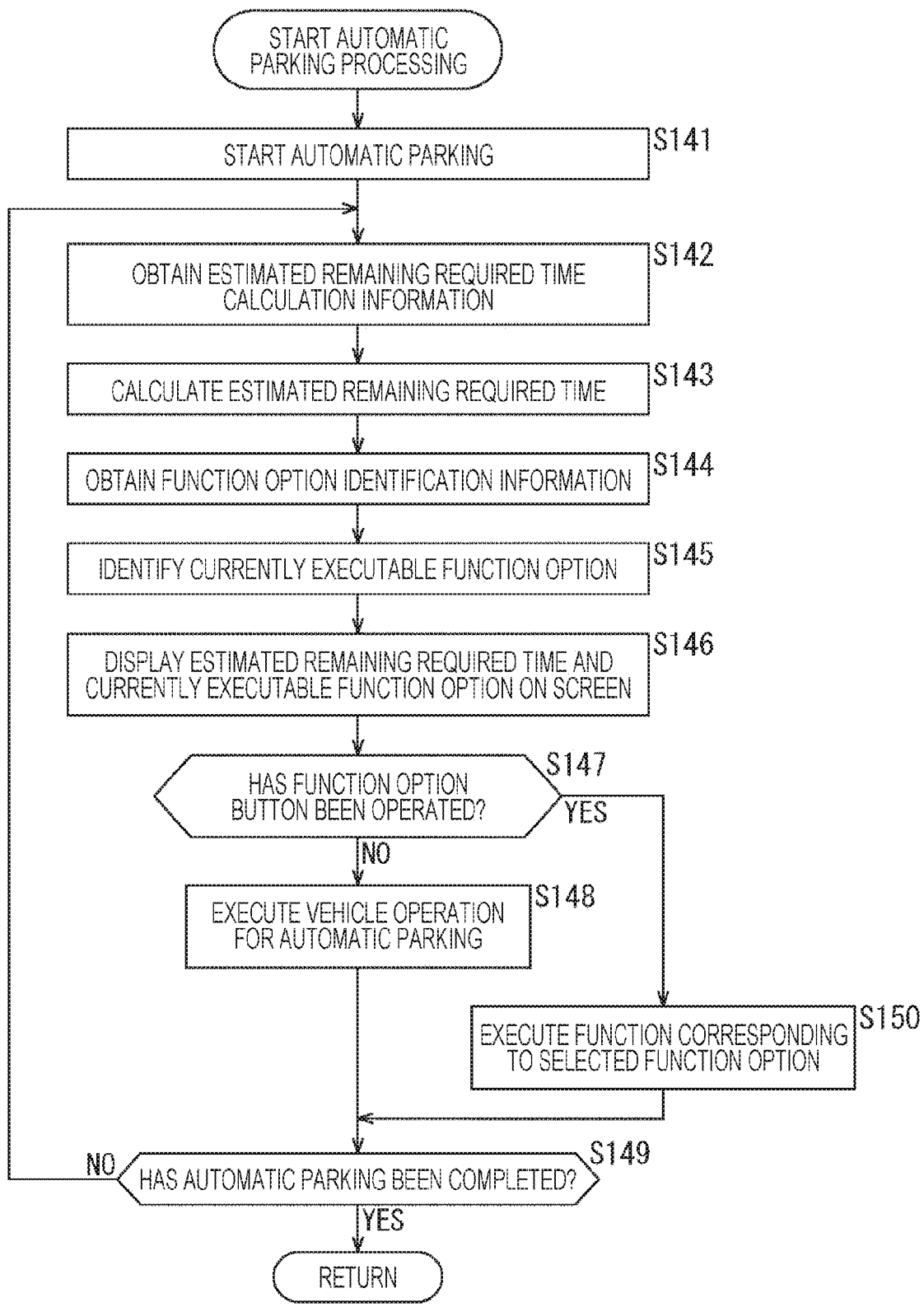
FIG. 12 is a flowchart illustrating a flow of automatic parking processing.
Figure 13:
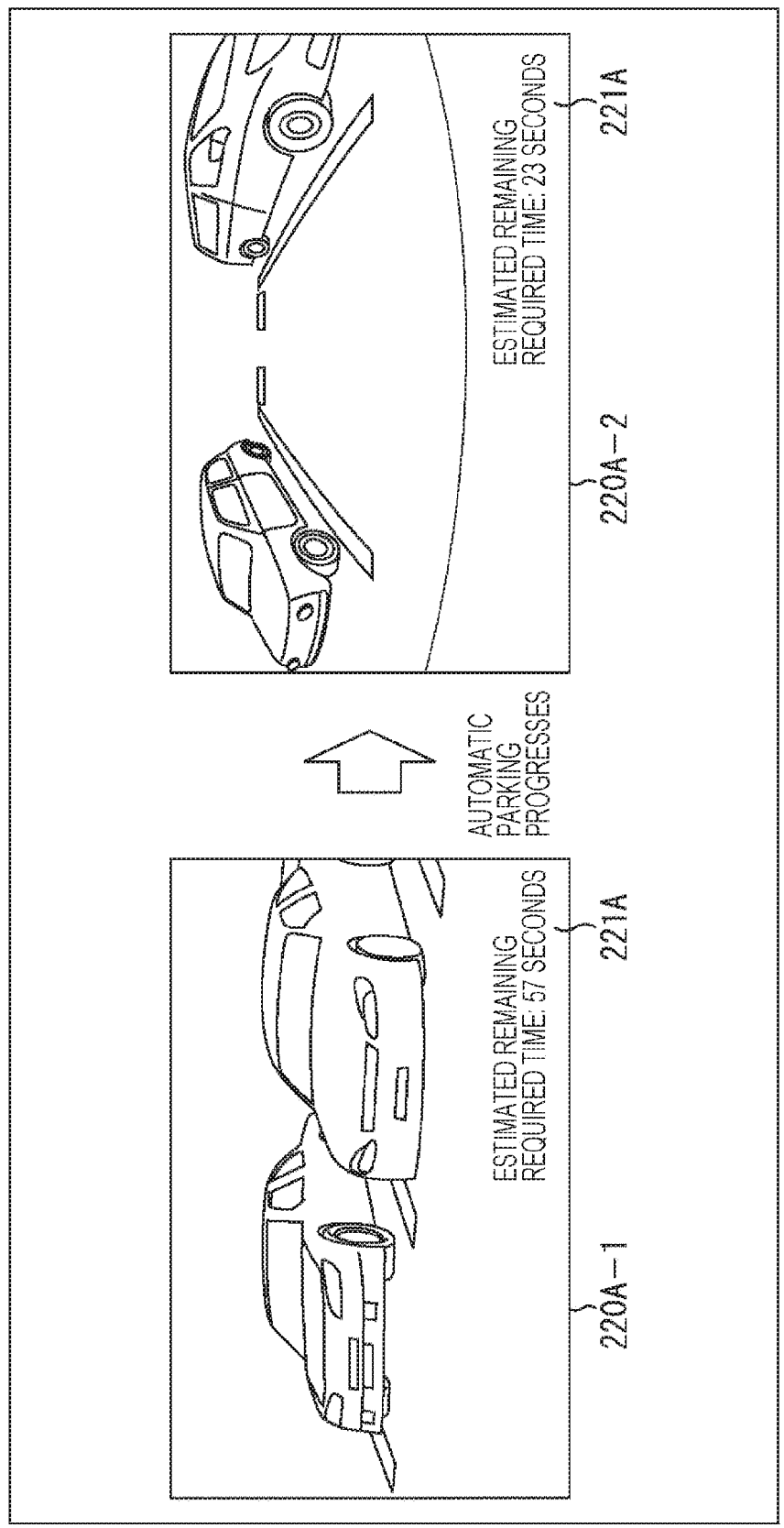
FIG. 13 is a drawing illustrating a display example of an estimated remaining required time presentation screen.

In the estimated remaining required time presentation screen 220A shown in FIG. 13, the estimated remaining required time 221A from the present point of time until the completion of automatic parking is displayed together with a captured image of the parking area image-captured by the sensor 12. The estimated remaining required time 221A is represented as time information corresponding to the estimated remaining required time calculated by the processing of the step S143 shown in FIG. 12.

FIG. 13 presents an estimated remaining required time presentation screen 220A-1 that is displayed immediately after automatic parking is started, and an estimated remaining required time presentation screen 220A-2 that is displayed after the automatic parking has progressed to some extent.

The estimated remaining required time presentation screen 220A-1 shows that at the present point of time during automatic parking, 57 seconds are required from the present point of time until the completion of automatic parking. In addition, the estimated remaining required time presentation screen 220A-2 that is displayed after the automatic parking has progressed to some extent from that point of time shows that at the present point of time during automatic parking, 23 seconds are required from the present point of time until the completion of automatic parking.

Thus, by checking the estimated remaining required time presentation screen 220A shown in FIG. 13, the user is enabled to grasp the time (the estimated remaining required time) taken from the present point of time during automatic parking until the completion of automatic parking at all times.

(B) Display Example 2

Figure 14:
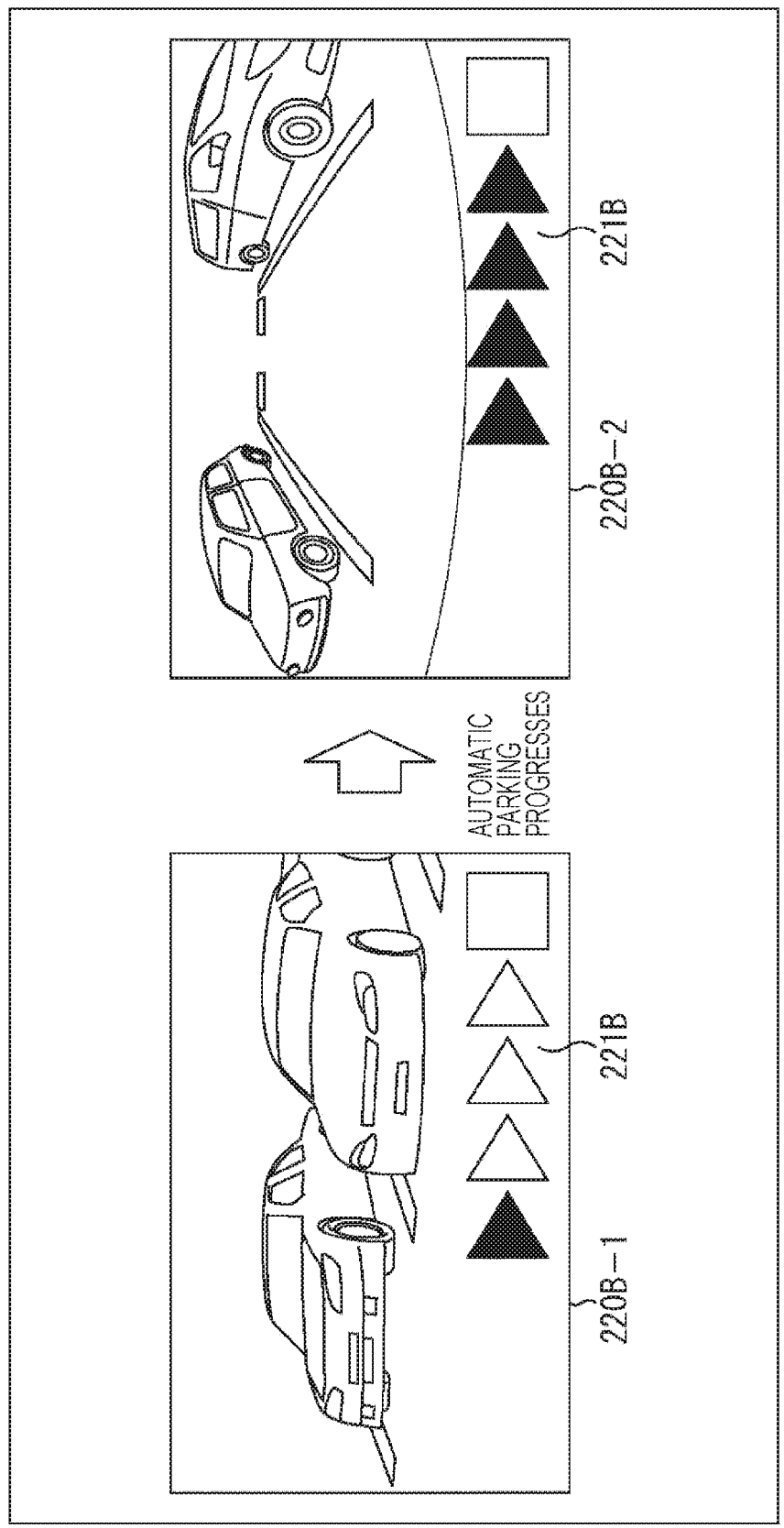
FIG. 14 is a drawing illustrating a display example of an estimated remaining required time presentation screen.

In the estimated remaining required time presentation screen 220B shown in FIG. 14, the estimated remaining required time 221B from the present point of time until the completion of automatic parking is displayed together with a captured image of the parking area. The estimated remaining required time 221B is represented as an indicator indicating the progress corresponding to the estimated remaining required time calculated by the processing of the step S143 shown in FIG. 12.

FIG. 14 presents an estimated remaining required time presentation screen 220B-1 that is displayed immediately after automatic parking is started, and an estimated remaining required time presentation screen 220B-2 that is displayed after the automatic parking has progressed to some extent.

In the estimated remaining required time presentation screen 220B-1, graphic symbols (for example, triangular and square graphic symbols) superimposed on the captured image indicate that the progress at the present point of time during automatic parking until the completion of automatic parking is approximately 0 to 20%. In addition, in the estimated remaining required time presentation screen 220B-2 that is displayed after the automatic parking has progressed to some extent from that point of time, it is indicated that the progress at the present point of time during automatic parking until the completion of automatic parking is approximately 60 to 80%.

More specifically, in the estimated remaining required time presentation screen 220B, a degree of progress of the automatic parking processing (a stage corresponding to the progress of the automatic parking processing) can be represented by using, for example, triangular and square graphic symbols. For example, in the estimated remaining required time presentation screen 220B, among five graphic symbols (four triangles and one square), the leftmost triangle can indicate, as a stage 1, that "(1) a vehicle during automatic parking has advanced to the front of a target parking lot", and the second triangle from the left can indicate, as a stage 2, that "(2) the vehicle during automatic parking has advanced to a cutting-wheel start position".

Further, among the five graphic symbols, the third triangle from the left can indicate, as a stage 3, that "(3) the vehicle during automatic parking has cut the wheel, and has moved back to the front of the target parking lot, and the fourth triangle from the left can indicate, as a stage 4, that "(4) the vehicle during automatic parking moves straight back to align a position". Furthermore, among the five graphic symbols, the right most square can indicate, as a stage 5, that "(5) parking has been completed".

For example, the estimated remaining required time presentation screen 220B-1 represents the stage 1 as the progress of the automatic parking processing, the stage 1 corresponding to a case where the vehicle during automatic parking has advanced to the front of the target parking lot. In addition, for example, the estimated remaining required time presentation screen 220B-2 represents the stage 4 as the progress of the automatic parking processing, the stage 4 corresponding to a case where the vehicle during automatic parking moves straight back to align a position.

Thus, by checking the estimated remaining required time presentation screen 220B shown in FIG. 14, the user is enabled to more intuitively recognize the progress at the present point of time during automatic parking until the completion of automatic parking (for example, a stage corresponding to the progress of the automatic parking processing).

(C) Display Example 3

Figure 15:
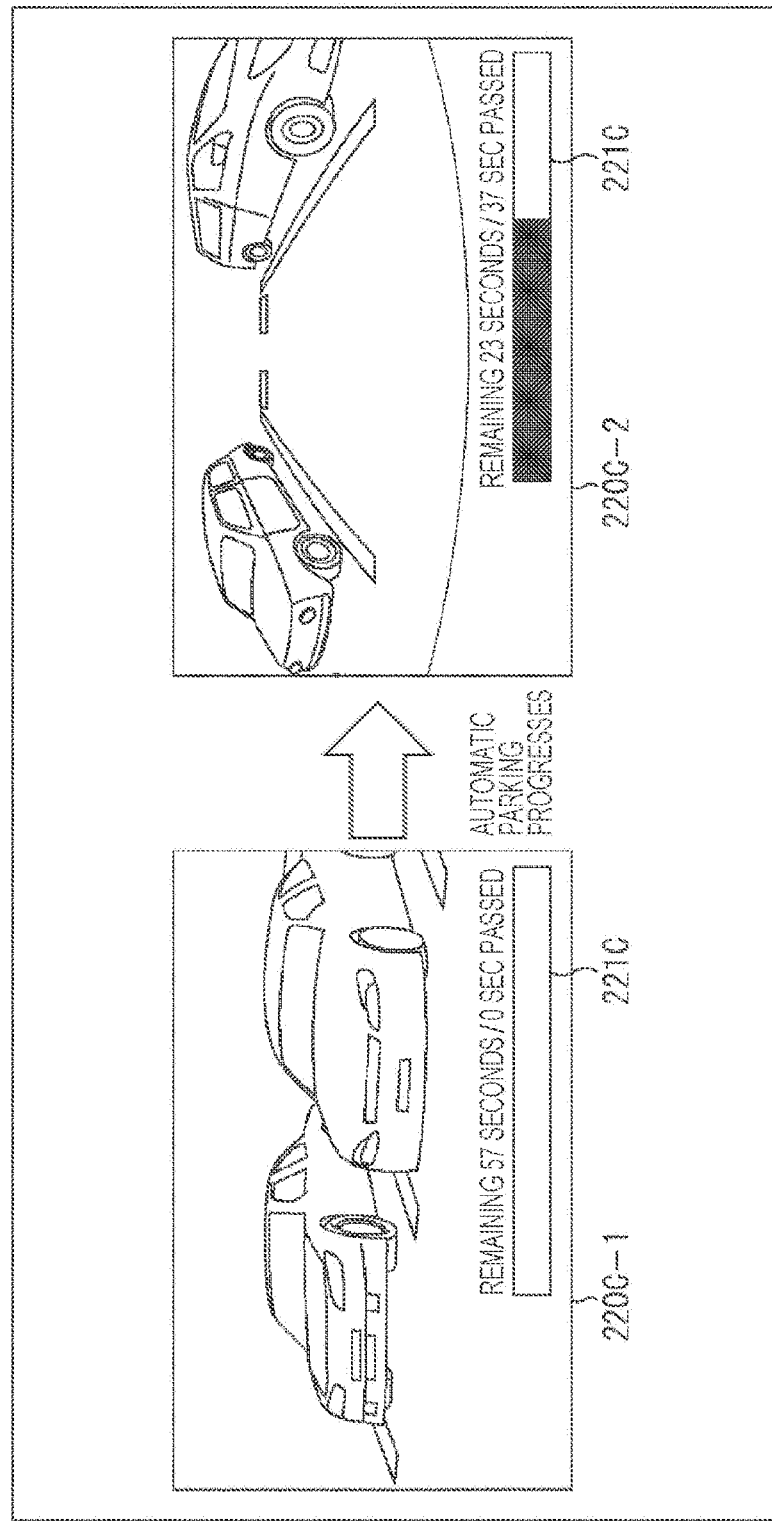
FIG. 15 is a drawing illustrating a display example of an estimated remaining required time presentation screen.

In the estimated remaining required time presentation screen 220C shown in FIG. 15, the estimated remaining required time 221C from the present point of time until the completion of automatic parking is displayed together with a captured image of the parking area. The estimated remaining required time 221C is represented as a progress bar indicating the progress corresponding to the estimated remaining required time calculated by the processing of the step S143 shown in FIG. 12.

FIG. 15 presents an estimated remaining required time presentation screen 220C-1 that is displayed immediately after automatic parking is started, and an estimated remaining required time presentation screen 220C-2 that is displayed after the automatic parking has progressed to some extent.

In the estimated remaining required time presentation screen 220C-1, it is indicated that the progress at the present point of time during automatic parking until the completion of automatic parking is substantially 0%. It should be noted that here, information indicating that the estimated remaining required time is 57 seconds, and that 0 seconds have passed at the present point of time, is displayed together with the progress bar.

In addition, in the estimated remaining required time presentation screen 220C-2 that is displayed after the automatic parking has progressed to some extent from that point of time, it is indicated that the progress at the present point of time during automatic parking until the completion of automatic parking is approximately 60%. It should be noted that here, information indicating that the estimated remaining required time is 23 seconds, and that 37 seconds have passed at the present point of time, is displayed together with the progress bar. However, in this example, the estimated remaining required time does not agree with the sum of the elapsed time in each screen. This is caused by a change in the estimated remaining required time that has changed for some cause.

Thus, by checking the estimated remaining required time presentation screen 220C shown in FIG. 15, the user is enabled to more intuitively recognize the progress at the present point of time during automatic parking until the completion of automatic parking.

The display examples of the estimated remaining required time presentation screen have been described above. It should be noted that the above-described estimated remaining required time presentation screens 220A to 220C (FIGS. 13 to 15) are examples of the estimated remaining required time presentation screens displayed during automatic parking, and other display formats may be employed so long as the estimated remaining required time corresponding to the automatic parking mode selected at the present point of time is displayed.

(Display Example of Automatic-Parking-Time Mode Change Screen)

Next, display examples of the automatic-parking-time mode change screen that is displayed by the processing of the step S146 shown in FIG. 12, and that includes the estimated remaining required time and currently executable function options, will be described with reference to FIGS. 16 to 18. It should be noted that the automatic-parking-time mode change screen (FIG. 16 to FIG. 18) and the estimated remaining required time presentation screen (FIGS. 13 to 15) can be changed to each other, for example, a change from the automatic-parking-time mode change screen to the estimated remaining required time presentation screen can be made, or conversely, a change from the estimated remaining required time presentation screen to the automatic-parking-time mode change screen can be made.

(A) Display Example 1

Figure 16:
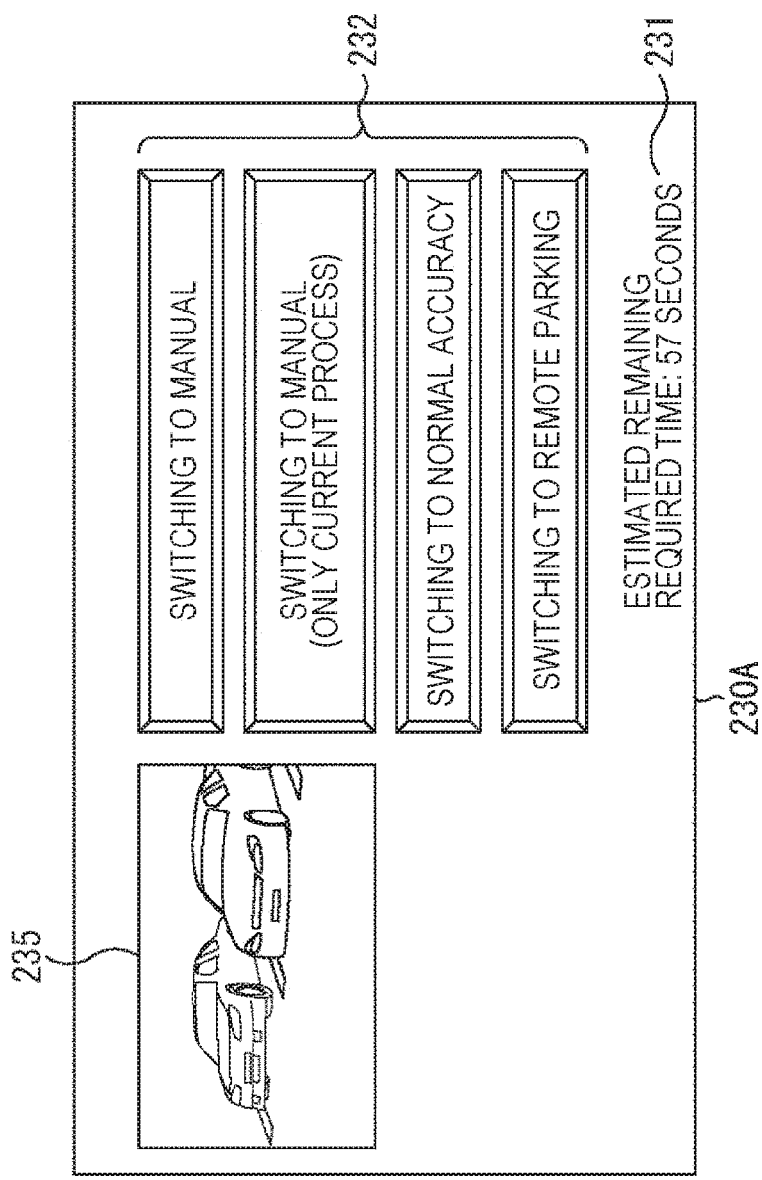
FIG. 16 is a drawing illustrating a display example of an automatic-parking-time mode change screen.

In the automatic-parking-time mode change screen 230A shown in FIG. 16, an estimated remaining required time 231, and function option buttons 232 used to select respective currently executable function options are displayed. In addition, names corresponding to the respective currently executable function options are displayed in the function option buttons 232 respectively. Moreover, the automatic-parking-time mode change screen 230A displays a captured image 235 of the parking area at the present point of time during automatic parking.

The estimated remaining required time 231 corresponds to the estimated remaining required time calculated by the processing of the step S143 shown in FIG. 12. However, here, the estimated remaining required time corresponding to the target automatic parking mode is calculated by using the estimated remaining required time calculation information corresponding to the automatic parking mode selected at the present point of time. In this display example, it is estimated that 57 seconds are required from the present point of time until the completion of automatic parking.

The function option buttons 232 correspond to the currently executable function options identified by the processing of the step S145 shown in FIG. 12. However, here, currently executable function options are identified by using the function option identification information at the present point of time.

In this display example, "switching to manual" for switching to the manual parking mode, "switching to manual (only current process)" for switching only a current process to the manual parking mode, "switching to normal accuracy" for switching to the normal-accuracy automatic parking mode, and "switching to remote parking" for switching to a remote-parking automatic parking mode are displayed as currently executable function options.

By checking the automatic-parking-time mode change screen 230A shown in FIG. 16, the user is enabled to grasp the estimated remaining required time in the current automatic parking mode, and currently executable function options. Subsequently, the user takes the estimated remaining required time in the current automatic parking mode into consideration, and when the user has accepted switching to parking (automatic parking or manual parking) in another parking mode, the user has only to operate the function option button 232 corresponding to a desired currently executable function option. This enables to switch from the current automatic parking mode to desired another parking mode, and parking (automatic parking or manual parking) corresponding to the desired another parking mode is started.

For example, the user is allowed to select an arbitrary function option from among four currently executable function options (other parking modes) according to a current situation (for example, a degree of difficulty of parking, a user's own skill, how much the user hurries, etc.) or the like. More specifically, for example, in a case where the user who is selecting automatic parking in the high-accuracy automatic parking mode desires to switch from automatic parking to manual parking because it takes longer time than expected, the user has only to operate the function option button 232 corresponding to switching to the manual parking mode.

It should be noted that although the estimated remaining required time 231 and the captured image 235 are displayed in the automatic-parking-time mode change screen 230A shown in FIG. 16, this estimated remaining required time 231 can be displayed in a display format corresponding to any of the estimated remaining required time 221A of the estimated remaining required time presentation screen 220A (FIG. 13), the estimated remaining required time 221B of the estimated remaining required time presentation screen 220B (FIG. 14), and the estimated remaining required time 221C of the estimated remaining required time presentation screen 220C (FIG. 15). In other words, with respect to the estimated remaining required time 231 shown in FIG. 16, as with the estimated remaining required time 221A shown in FIG. 13, the estimated remaining required time is represented as a numerical value indicating the remaining time. However, the estimated remaining required time may be represented by, for example, a stage corresponding to the progress of the automatic parking processing like the required time presentation screen 220B shown in FIG. 14, a progress bar like the estimated remaining required time 221C shown in FIG. 15, or the like.

(B) Display Example 2

Figure 17:
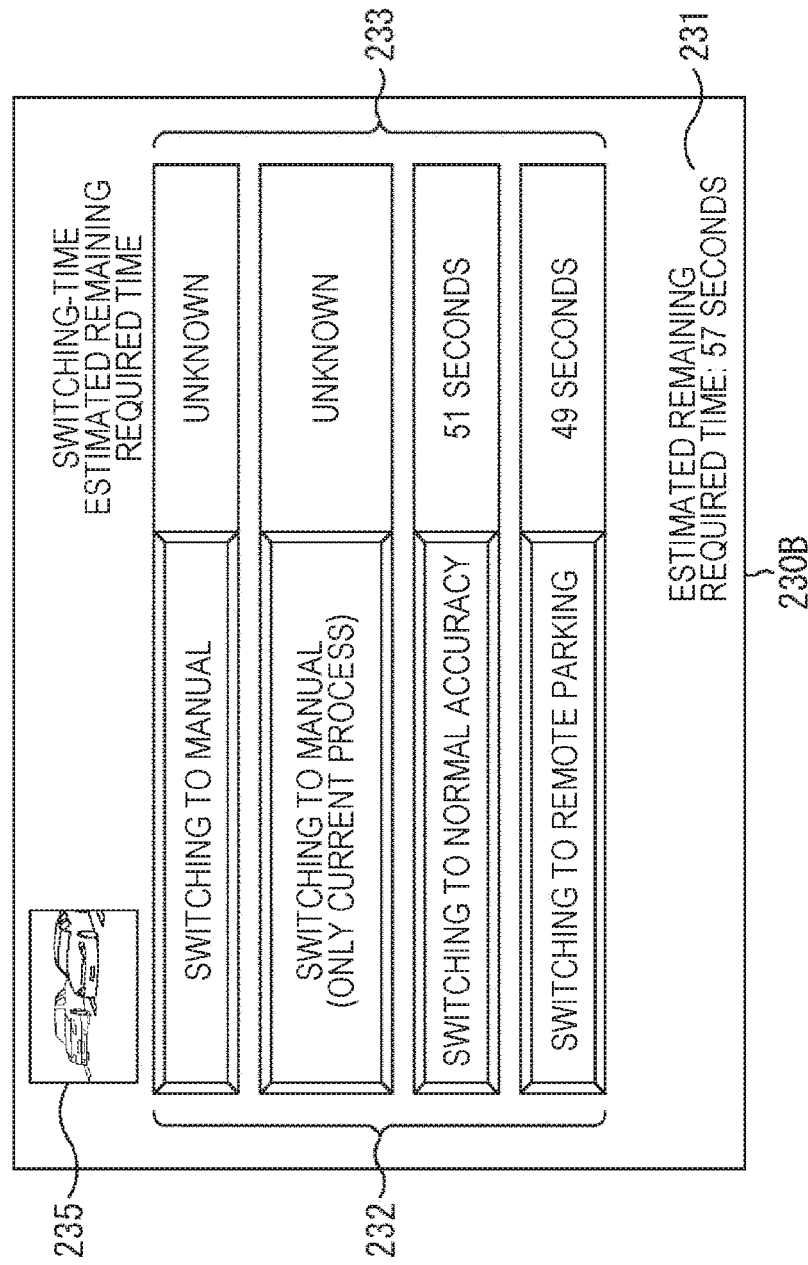
FIG. 17 is a drawing illustrating a display example of an automatic-parking-time mode change screen.

In the automatic-parking-time mode change screen 230B shown in FIG. 17, not only the estimated remaining required time 231 and the function option buttons 232, but also switching-time estimated remaining required times 233 for respective currently executable function options corresponding to the respective function option buttons 232 are displayed. Moreover, the automatic-parking-time mode change screen 230B displays the captured image 235 of the parking area at the present point of time during automatic parking.

The estimated remaining required time 231 corresponds to the estimated remaining required time calculated by the processing of the step S143 shown in FIG. 12. However, in this display example, it is estimated that 57 seconds are required from the present point of time until the completion of automatic parking.

The function option buttons 232 correspond to the currently executable function options identified by the processing of the step S145 shown in FIG. 12. However, in this display example, "switching to manual", "switching to manual (only current process)", "switching to normal accuracy", and "switching to remote parking" are displayed as the currently executable function options.

With respect to the switching-time estimated remaining required times 233, by performing processing for calculating the estimated remaining required times (processing similar to that of the step S143 shown in FIG. 12) for the currently executable function options identified by the processing of the step S145 shown in FIG. 12, the switching-time estimated remaining required times are calculated for the respective currently executable function options.

For example, in a case where a currently selected automatic parking mode is switched to the manual parking mode (including a case of only current process), the estimated remaining required time at the time of switching cannot be calculated, and therefore "Unknown" is displayed. In addition, in a case where the currently selected automatic parking mode is switched to the normal-accuracy automatic parking mode, it is estimated that 51 seconds are required until the automatic parking in the normal-accuracy automatic parking mode is completed. Moreover, in a case where the currently selected automatic parking mode is switched to the remote-parking automatic parking mode, it is estimated that 49 seconds are required until the automatic parking in the remote-parking automatic parking mode is completed.

By checking the automatic-parking-time mode change screen 230B shown in FIG. 17, the user is enabled to grasp not only the estimated remaining required time in the current automatic parking mode, but also the currently executable function options, and the switching-time estimated remaining required times therefor. Subsequently, the user takes the estimated remaining required time in the current automatic parking mode, and the switching-time estimated remaining required time for a case where the parking mode is switched to another parking mode, into consideration, and when the user has accepted switching to parking (automatic parking or manual parking) in the another parking mode, the user has only to operate the function option button 232 corresponding to a desired currently executable function option. This enables to switch from the current automatic parking mode to desired another parking mode, and parking (automatic parking or manual parking) corresponding to the desired another parking mode is started.

For example, the user is allowed to select an arbitrary function option from among four currently executable function options (other parking modes) according to a current situation (for example, a degree of difficulty of parking, a user's own skill, how much the user hurries, etc.) or the like. More specifically, for example, in a case where the user who is selecting automatic parking in the high-accuracy automatic parking mode desires to switch from the high-accuracy automatic parking mode to the normal-accuracy automatic parking mode because it takes longer time than expected, the user has only to operate the function option button 232 corresponding to switching to the normal-accuracy automatic parking mode.

It should be noted that although the estimated remaining required time 231 and the captured image 235 are displayed in the automatic-parking-time mode change screen 230B shown in FIG. 17, this estimated remaining required time 231 can be displayed in a display format corresponding to any of the estimated remaining required time 221A (FIG. 13), the estimated remaining required time 221B (FIG. 14) and the estimated remaining required time 221C (FIG. 15). In other words, the estimated remaining required time 231 shown in FIG. 17 may be represented by a numerical value indicating the remaining time (FIG. 13), and may be represented by, for example, a stage corresponding to the progress of the automatic parking processing (FIG. 14), a progress bar (FIG. 15) or the like.

(C) Display Example 3

Figure 18:
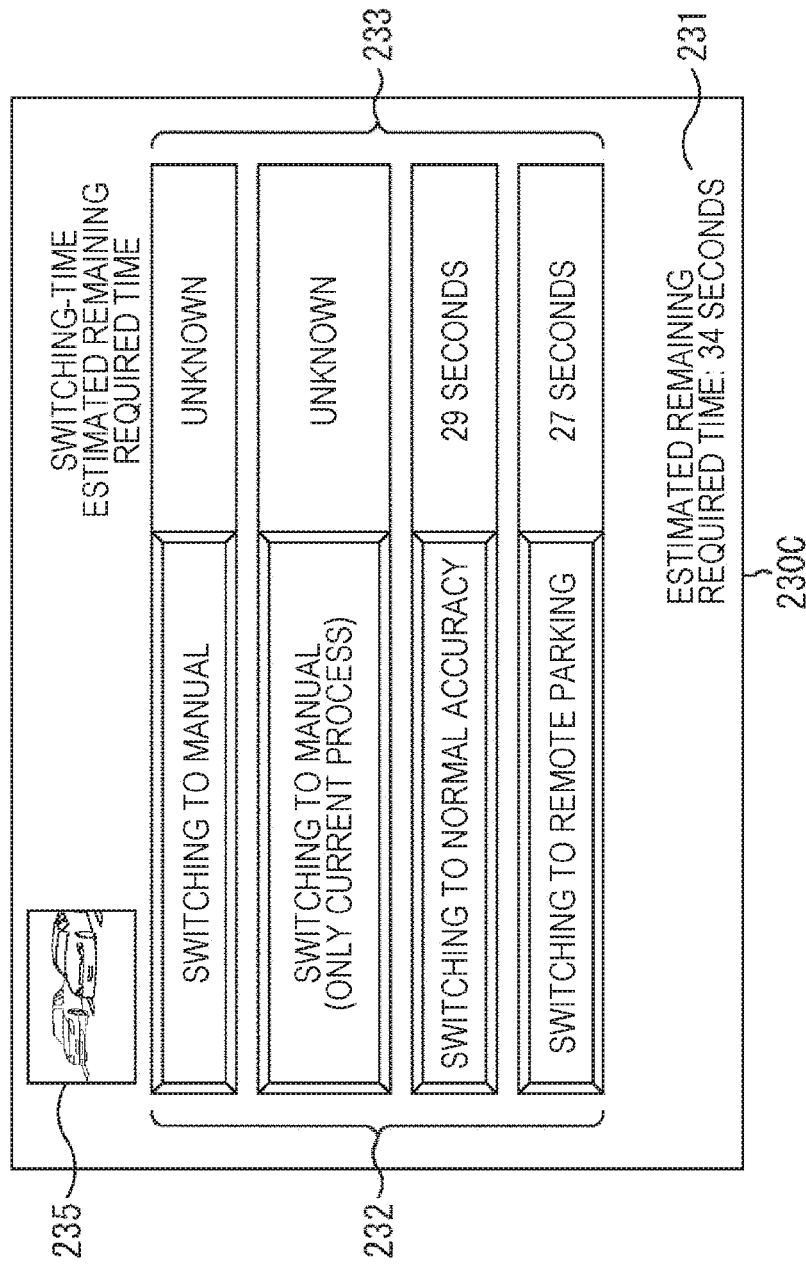
FIG. 18 is a drawing illustrating a display example of an automatic-parking-time mode change screen.

In the automatic-parking-time mode change screen 230C shown in FIG. 18, as with the automatic-parking-time mode change screen shown in FIG. 17 230B, the estimated remaining required time 231, the function option buttons 232, the switching-time estimated remaining required times 233, and the captured image 235 of the parking area are displayed. That is to say, the automatic-parking-time mode change screen 230C represents a screen (screen after update) after a lapse of a predetermined time from displaying of the automatic-parking-time mode change screen 230B.

In other words, the estimated remaining required time 231 shown in FIG. 18 decreases from 57 seconds to 34 seconds in comparison with the estimated remaining required time 231 shown in FIG. 17 because automatic parking corresponding to the automatic parking mode progresses. Similarly, the switching-time estimated remaining required time in the normal-accuracy automatic parking mode decreases from 51 seconds to 29 seconds, and the switching-time estimated remaining required time in the remote-parking automatic parking mode decreases from 49 seconds to 27 seconds.

By checking the automatic-parking-time mode change screens 230B, 230C and the like that are time-sequentially updated, the user is enabled to grasp the estimated remaining required time in the current automatic parking mode, and the switching-time estimated remaining required time of the switched parking mode, in real time during automatic parking, and to switch the parking mode according to the situation.

It should be noted that in the automatic-parking-time mode change screen 230C shown in FIG. 18 as well, as with the automatic-parking-time mode change screen 230B shown in FIG. 17, the estimated remaining required time 231 (FIG. 18) may be represented as a numerical value indicating the remaining time (FIG. 13), and may be represented by, for example, a stage corresponding to the progress of the automatic parking processing (FIG. 14), a progress bar (FIG. 15) or the like.

The display examples of the automatic-parking-time mode change screens have been described above. It should be noted that the above-described automatic-parking-time mode change screens 230A to 230C (FIGS. 16 to 18) are examples of automatic parking mode change screens displayed during automatic parking, and other display formats may be employed so long as the estimated remaining required time corresponding to the automatic parking mode selected at the present point of time, and currently executable function options, are displayed.

As described above, in the automatic parking system 1 to which the present technology is applied, by allowing the user to select proper behavior while enabling the user to grasp the required time taken to perform automatic parking, parking can be performed according to a desired parking method. Therefore, the automatic parking system 1 is configured to present options related to parking, and required times until the completion of automatic parking for the respective options, after an instruction to perform automatic parking is given. This enables the user to properly perform decision-making, that is to say, for example, leaving parking to the system, or performing parking by oneself.

<4. Remote Parking Processing>

(Configuration Example of Automatic Parking System Corresponding to Remote Parking)

Figure 19:
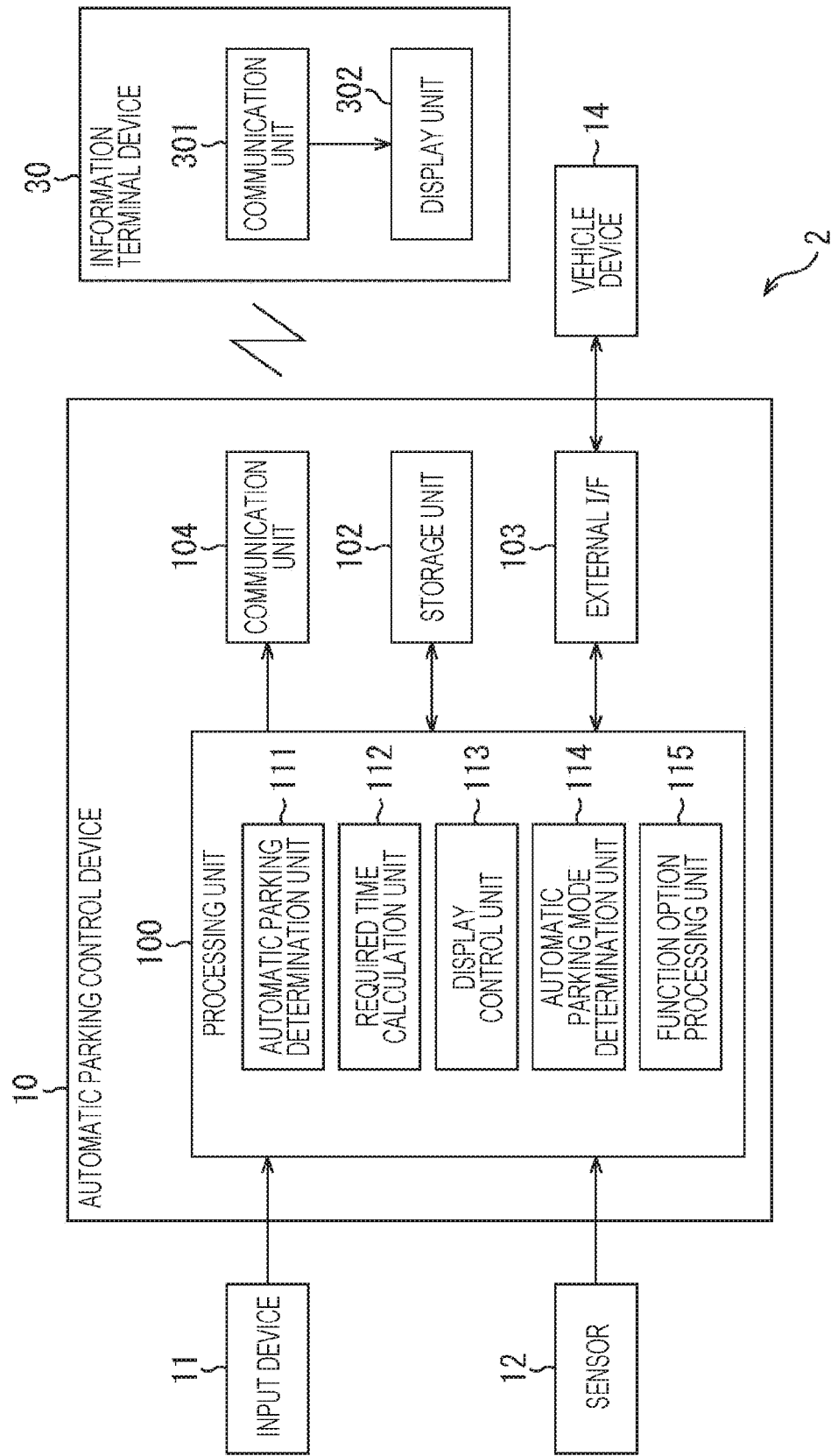
FIG. 19 is a diagram illustrating a configuration example of an automatic parking system corresponding to remote parking.

FIG. 19 is a diagram illustrating a configuration example of an automatic parking system corresponding to remote parking.

In an automatic parking system 2 shown in FIG. 19, the same reference numerals are used to denote parts corresponding to those of the automatic parking system 1 shown in FIG. 1, and repeated explanations will be omitted as appropriate.

In comparison with the automatic parking control device 10 shown in FIG. 1, the automatic parking control device 10 shown in FIG. 19 is provided with a communication unit 104 as an alternative to the output unit 101. The communication unit 104 exchanges data with an information terminal device 30 according to predetermined communication standards.

The information terminal device 30 is, for example, a mobile device such as a smart phone, a portable telephone, and a tablet type computer. The information terminal device 30 includes a communication unit 301 and a display unit 302. According to predetermined communication standards, the communication unit 301 exchanges data with the automatic parking control device 10 with which a vehicle is equipped. Incidentally, as communications performed between the automatic parking control device 10 and the information terminal device 30, it is possible to use wireless communications such as communications through a communication network corresponding to communication standards of portable telephones, for example, Bluetooth (registered trademark), a wireless Local Area Network (LAN), Long Term Evolution (LTE) or the like.

Data received by the communication unit 301 is supplied to the display unit 302. The display unit 302 displays information associated with automatic parking, the information being data received by the communication unit 301, and being handled by the automatic parking control device 10. In addition, for example, in a case where the user instructs an interruption of remote parking, the communication unit 301 notifies the automatic parking control device 10 of the instruction of the interruption of remote parking.

The automatic parking system 2 corresponding to remote parking is configured as described above.

(Flow of Remote Parking Processing)

Next, a flow of remote parking processing executed by the automatic parking system 2 shown in FIG. 19 will be described with reference to a flowchart shown in FIG. 20.

In a step S181, remote parking is started by a vehicle with which the automatic parking system 2 (FIG. 19) is equipped.

In a step S182, the processing unit 100 obtains safety determination information. Here, for example, position information and the like that enables to determine whether or not a user has gotten off a vehicle, and then has reached a safe position, is obtained as the safety determination information.

In a step S183, the processing unit 100 determines, on the basis of the safety determination information obtained by the processing of the step S182, whether or not the user has gotten off the vehicle, and then has reached the safe position.

In a case where it is determined to be "No" in the determination processing of the step S183, the process proceeds to a step S184.

In the step S184, the processing unit 100 controls the communication unit 104, and monitors a notification from the information terminal device 30. In addition, in a step S185, on the basis of a monitoring result obtained by the processing of the step S184, the processing unit 100 determines whether or not an instruction to interrupt remote parking has been received from the information terminal device 30. In the step S185, in a case where it is determined to be "No", the process returns to the step S182, and the subsequent processings are repeated.

In a case where it is determined to be "Yes" in the determination processing of the step S183, the process proceeds to a step S186. In the step S186, the required time calculation unit 112 obtains estimated remaining required time calculation information. It should be noted that the estimated remaining required time calculation information obtaining processing of this step S186 is similar to the processing of the step S142 shown in FIG. 12 described above, and therefore the detailed description thereof will be omitted.

In a step S187, the required time calculation unit 112 calculates the estimated remaining required time on an automatic parking mode basis on the basis of the estimated remaining required time calculation information obtained by the processing of the step S186. It should be noted that the estimated remaining required time calculation processing of this step S187 is similar to the processing of the step S143 shown in FIG. 12 described above, and therefore the detailed description thereof will be omitted.

In a step S188, the processing unit 100 controls the communication unit 104, and notifies, by for example wireless communication, the information terminal device 30 of information that includes the estimated remaining required time calculated by the processing of the step S187. Subsequently, in the information terminal device 30, information that includes the estimated remaining required time transmitted from the communication unit 104 of the automatic parking control device 10 is received by the communication unit 301, and is then displayed on the display unit 302. Consequently, even in a case where the user is at a position that is away from a vehicle with which the automatic parking system 2 is equipped, the user is enabled to grasp the progress of remote parking by checking the estimated remaining required time displayed on the display unit 302 of the information terminal device 30 possessed by the user.

In a step S189, vehicle operation for remote parking is executed. When the processing of the step S189 ends, the process proceeds to a step S190. In the step S190, a determination is made as to whether or not remote parking has been completed. In the step S190, in a case where it is determined that the remote parking has not been completed, the process proceeds to a step S191.

In the step S191, the processing unit 100 controls the communication unit 104, and monitors a notification from the information terminal device 30. In addition, in a step S192, on the basis of a monitoring result obtained by the processing of the step S191, the processing unit 100 determines whether or not an instruction to interrupt remote parking has been received from the information terminal device 30. In a case where it is determined to be "No" by the determination processing of the step S192, the process returns to the step S186, and the subsequent processings are repeated.

Figure 20:
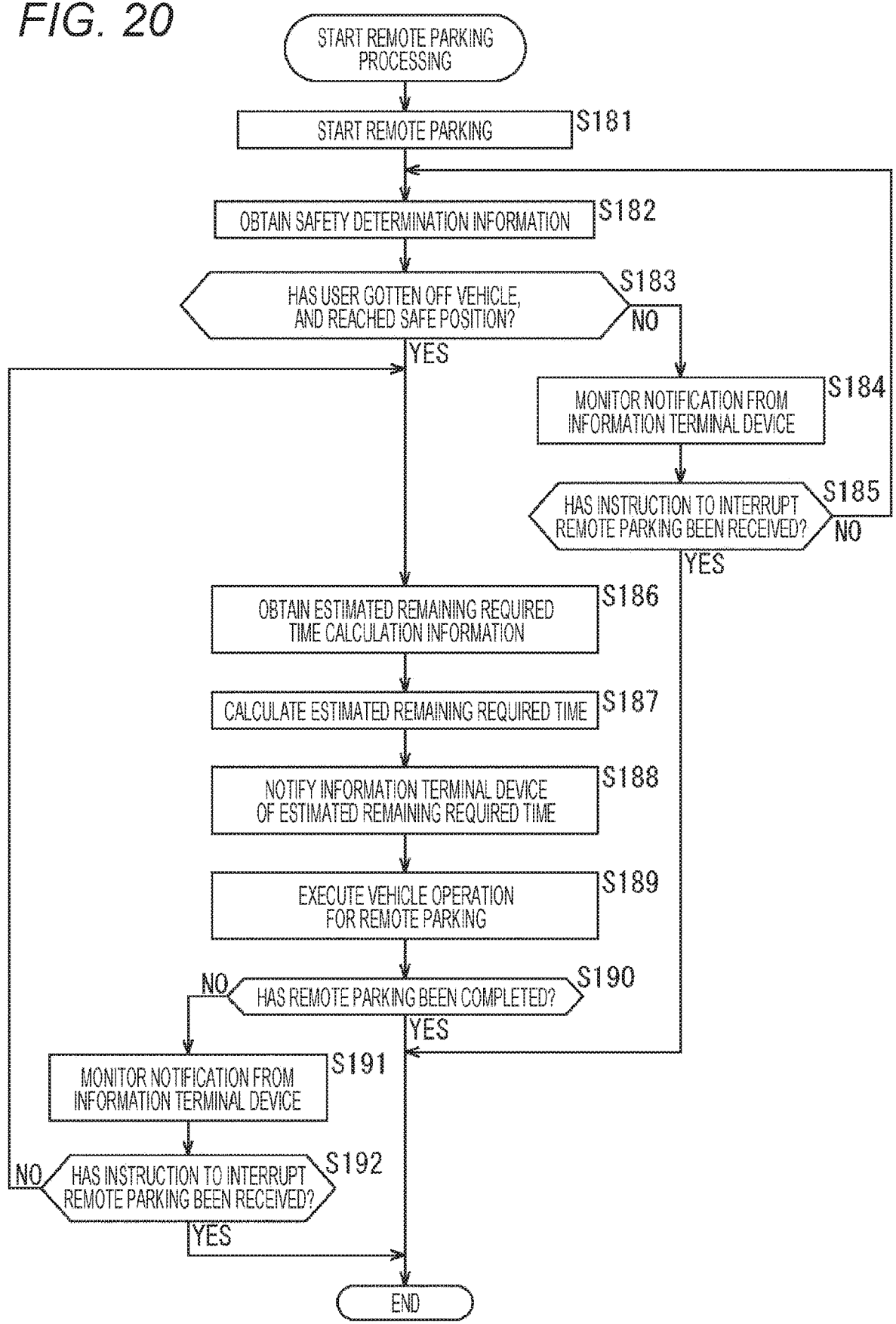
FIG. 20 is a flowchart illustrating a flow of remote parking processing.

In addition, in the step S190, in a case where it is determined that the remote parking has been completed, the remote parking processing shown in FIG. 20 ends. It should be noted that even in a case where it is determined, by the determination processing of the steps S185 and S192, that an instruction to interrupt remote parking has been received from the information terminal device 30, the remote parking processing shown in FIG. 20 ends.

The flow of the remote parking preprocessing has been described above.

<5. Learning Processing>

(Configuration Example of Automatic Parking System Corresponding to Learning Function)

Figure 21:
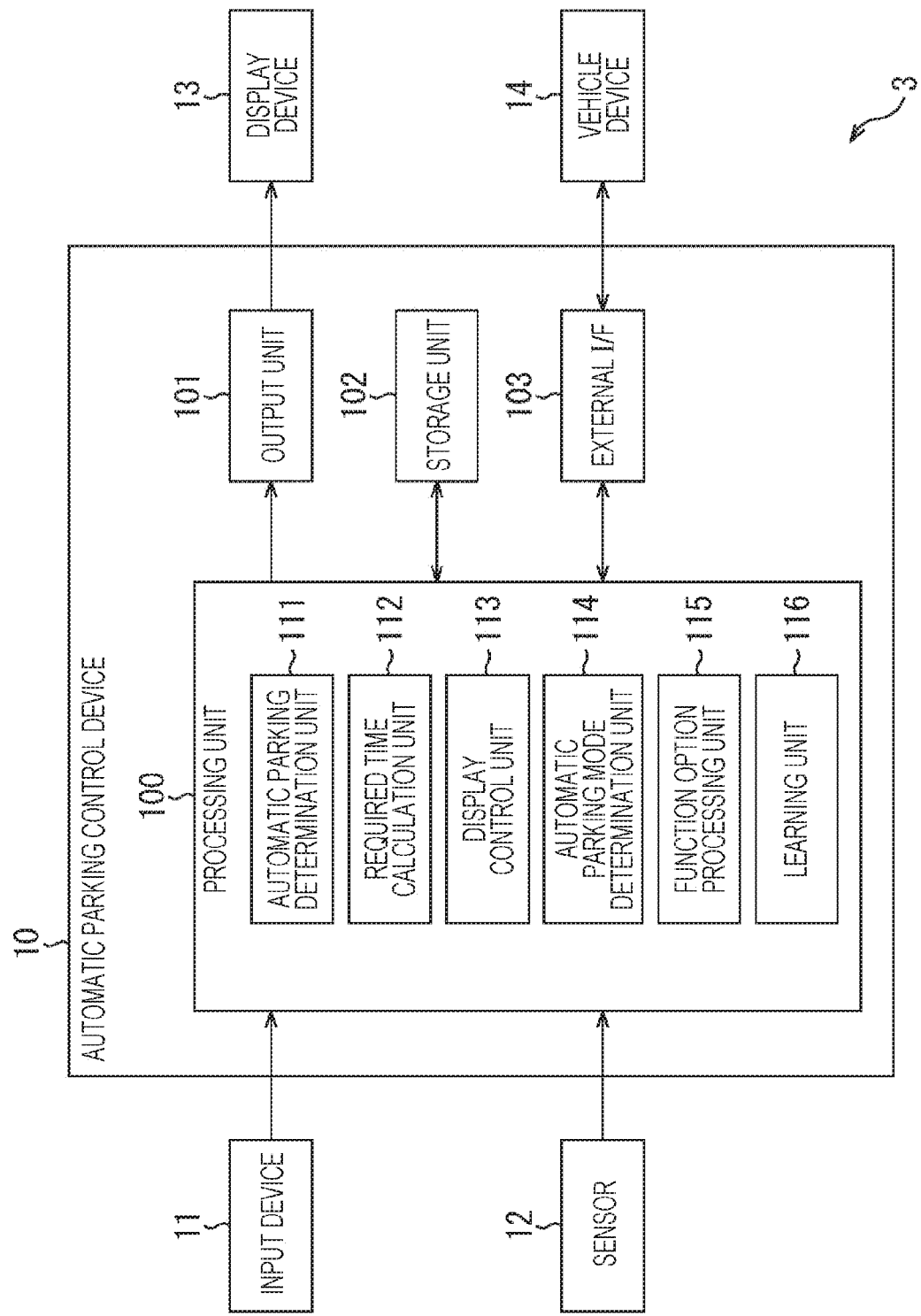
FIG. 21 is a diagram illustrating a configuration example of an automatic parking system corresponding to a learning function.

FIG. 21 is a diagram illustrating a configuration example of an automatic parking system corresponding to a learning function.

In an automatic parking system 3 shown in FIG. 21, the same reference numerals are used to denote parts corresponding to those of the automatic parking system 1 shown in FIG. 1, and repeated explanations will be omitted as appropriate.

The automatic parking control device 10 shown in FIG. 21 differs from the automatic parking control device 10 shown in FIG. 1 in that a learning unit 116 is added to the processing unit 100.

The learning unit 116 performs learning processing related to automatic parking, and accumulates results of the learning in the storage unit 102. For example, in a case where the user selects an option such as an automatic parking mode and a function option, the learning unit 116 performs learning processing so as to determine a display format of displaying the option, and accumulates results of the learning in the storage unit 102.

The display control unit 113 determines a display format of displaying an option such as an automatic parking mode and a function option on the basis of the results of learning accumulated in the storage unit 102. Subsequently, the display control unit 113 generates a screen that includes at least an option corresponding to the determined display format, and then causes the screen to be displayed on the display device 13 through the output unit 101.

Here, for example, frequencies of selected options (for example, automatic parking modes, function options, etc.) are accumulated in the storage unit 102 by the learning unit 116. Therefore, options (for example, automatic parking modes, function options, etc.) can be displayed in the order of decreasing frequency by using the frequencies. In addition, histories of selected options (for example, automatic parking modes, function options, etc.) are accumulated in the storage unit 102 by the learning unit 116. Therefore, options (for example, automatic parking modes, function options, etc.) can be displayed in the order of most recently selected.

In addition, histories of selected options (for example, automatic parking modes, function options, etc.) are accumulated in the storage unit 102 by the learning unit 116. Therefore, options (for example, automatic parking modes, function options, etc.) can be displayed in the order of the option selected earlier by one in the past system that is similar to the most recently selected system. Moreover, the estimated required times of selected options (for example, automatic parking modes, function options, etc.) are accumulated in the storage unit 102 by the learning unit 116. Therefore, on the assumption that an average value of the estimated required times is a favorable required time, options can be displayed in the order of the option that corresponds to the estimated required time close to the favorable required time among the options.

It should be noted that the display format presented here, which uses the results of learning, is merely an example, and options (for example, automatic parking modes, function options, etc.) that are preferable for the user can be presented by using all results of learning performed by the learning unit 116, the results being accumulated in the storage unit 102. In addition, here, the most preferable options (for example, automatic parking modes, function options, etc.) may be automatically selected without being selected by the user by using the results of learning.

Further, the automatic parking mode determination unit 114 may be configured to determine an automatic parking mode on the basis of the results of learning accumulated in the storage unit 102. Moreover, the function option processing unit 115 may be configured to identify a currently executable function option on the basis of the results of learning accumulated in the storage unit 102.

In addition, in the configuration of the automatic parking system 3 shown in FIG. 21, the automatic parking control device 10 is provided with the learning unit 116 that performs learning processing, and the storage unit 102 that stores results of learning. However, at least one of the function of the learning unit 116 and the function of the storage unit 102 may be provided in a server and the like on Internet, and the automatic parking control device 10 may be configured to obtain data processed by the server.

The automatic parking system 3 corresponding to the learning function is configured as described above.

(Flow of Function Option Display Processing Corresponding to Results of Learning)

Figure 22:
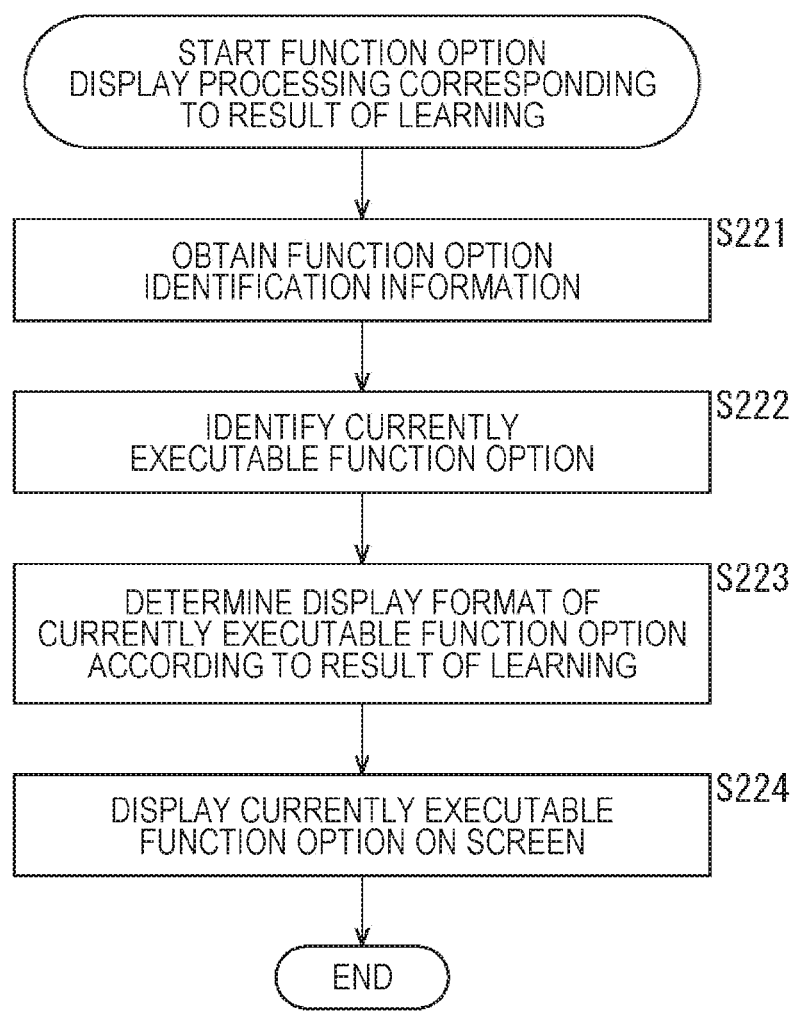
FIG. 22 is a flowchart illustrating a flow of function option display processing based on a result of learning.

Next, a flow of function option display processing corresponding to results of learning executed by the automatic parking system 3 shown in FIG. 21 will be described with reference to a flowchart shown in FIG. 22.

Incidentally, in the example of option display processing corresponding to the results of learning, a case where function options are displayed as options is described as an example. In addition, it is assumed that prior to the function option display processing corresponding to the results of learning, learning processing is performed by the learning unit 116, and the results of learning are accumulated in the storage unit 102.

In a step S221, the function option processing unit 115 obtains function option identification information. It should be noted that the function option identification information obtaining processing of this step S221 is similar to the processing of the step S144 shown in FIG. 12 described above, and therefore the detailed description thereof will be omitted.

In a step S222, the function option processing unit 115 identifies a currently executable function option on the basis of the function option identification information obtained by the processing of the step S221. It should be noted that the function option identification processing of this step S222 is similar to the processing of the step S145 shown in FIG. 12 described above, and therefore the detailed description thereof will be omitted.

In a step S223, the display control unit 113 determines a display format of the currently executable function option determined by the processing of the step S222 on the basis of the results of learning accumulated in the storage unit 102.

In a step S224, the display control unit 113 generates a screen that includes at least a currently executable function option corresponding to the display format determined by the processing of the step S223, and causes the screen to be displayed on the display device 13 through the output unit 101.

Here, as a screen that includes at least the currently executable function option corresponding to the display format, for example, the automatic-parking-time mode change screen (FIGS. 16 to 18) can be displayed. For example, in a case where the frequency with which a target user switches to remote parking during automatic parking is high, the option of "switching to remote parking" for switching to the remote-parking automatic parking mode is displayed by priority.

When the processing of the step S224 ends, the function option display processing corresponding to the results of learning ends.

The flow of the function option display processing corresponding to the results of learning has been described above. Incidentally, here, displaying of the currently executable function option corresponding to the results of learning has been described as an example. However, for example, the option (automatic parking mode) of the selective automatic parking start screen (FIGS. 7 to 11) described above may be displayed according to the results of learning. For example, when a target user starts automatic parking, in a case where the frequency with which the "normal-accuracy backward parking mode" is selected is high, an option for selecting the "normal-accuracy backward parking mode" has only to be displayed by priority.

<6. Configuration of Computer>

The above-described series of processing can be executed by hardware, and can also be executed by software. In a case where the series of processing is executed by software, a program that configures the software is installed in a computer. Here, the computer includes a computer that is built into dedicated hardware, and a computer that is capable of executing various kinds of functions by installing various kinds of programs, for example, a general-purpose personal computer, and the like.

Figure 23:
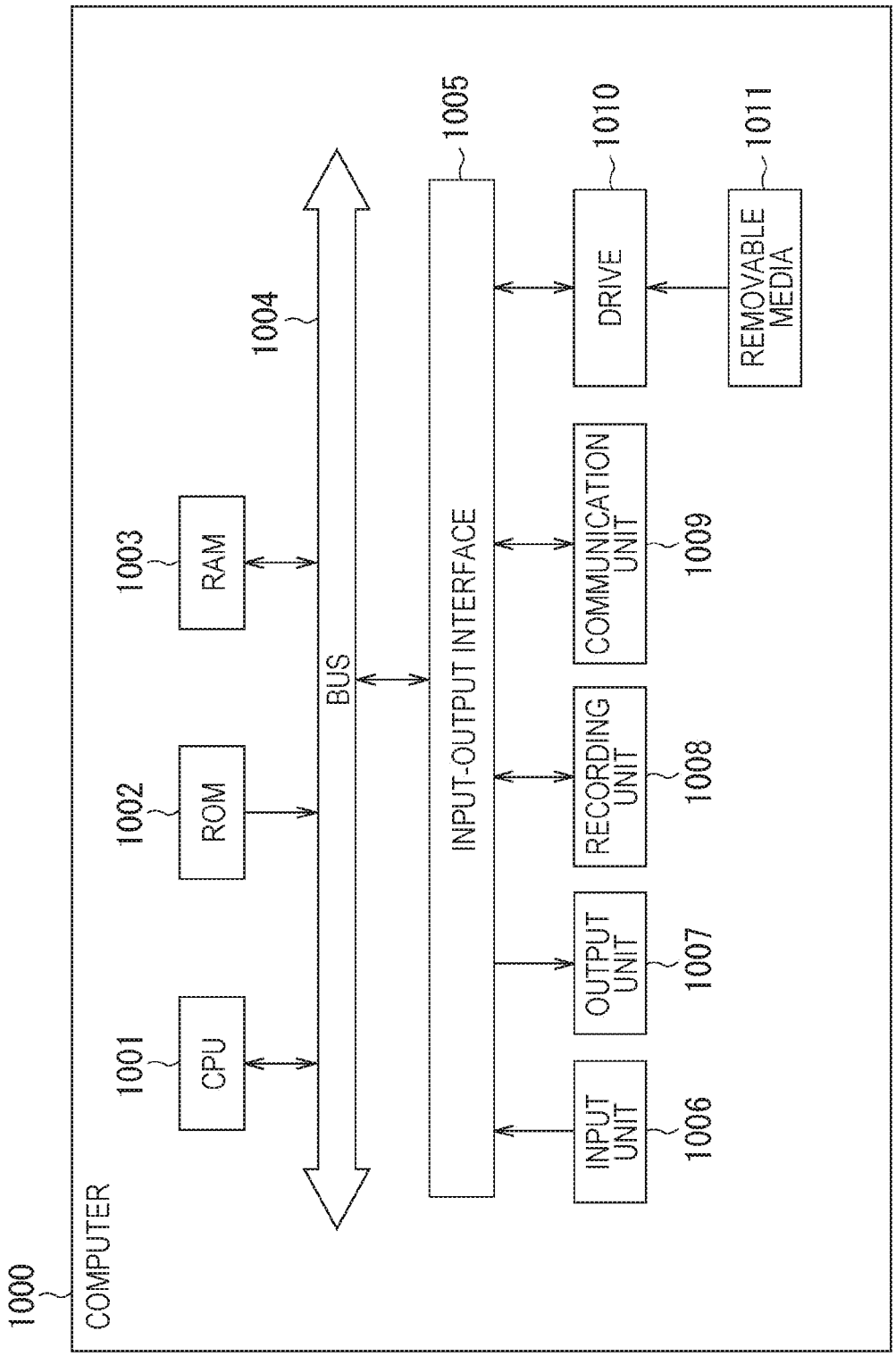
FIG. 23 is a diagram illustrating a configuration example of a computer.

FIG. 23 is a block diagram illustrating, as an example, a hardware configuration of a computer that executes the above-described series of processing by a program.

In a computer 1000, a Central Processing Unit (CPU) 1001, a Read Only Memory (ROM) 1002, and a Random Access Memory (RAM) 1003 are mutually connected through a bus 1004. An input-output interface 1005 is further connected to the bus 1004. An input unit 1006, an output unit 1007, a recording unit 1008, a communication unit 1009, and a drive 1010 are connected to the input-output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable media 1011 such as a magnetic disk, an optical disk, a magneto-optical disk, or a semiconductor memory.

In the computer 1000 that is configured as described above, the CPU 1001 loads, for example, a program stored in the recording unit 1008 into the RAM 1003 through the input-output interface 1005 and the bus 1004, then executes the program, and consequently the above-described series of processing is performed.

The program executed by the computer 1000 (CPU 1001) can be provided by being recorded, for example, in a removable media 1011 such as a package media. In addition, the program can be provided through a wired or wireless transmission medium such as a local area network, Internet, and digital satellite broadcasting.

In the computer 1000, the program can be installed in the recording unit 1008 through the input-output interface 1005 by mounting the removable media 1011 to the drive 1010. In addition, the program can be received by the communication unit 1009 through a wired or wireless transmission medium, and can be installed in the recording unit 1008. Besides the above, the program can be installed in the ROM 1002 or the recording unit 1008 beforehand.

It should be noted that the program executed by the computer 1000 may be a program in which processing is time-sequentially performed along the order described in the present description, or may be a program in which processing is performed in parallel or in the required timing, for example, when a call is made.

Here, in the present description, it is not always necessary to time-sequentially process a processing step that describes a program for causing the computer 1000 to perform various kinds of processing along the order described as a flowchart, and the processing step also includes processing that is executed in parallel or individually (for example, parallel processing or processing by an object).

In addition, the program may be processed by one computer, or may be subjected to distributed processing by a plurality of computers. Moreover, the program may be transmitted to a distant computer so as to be executed.

<7. Vehicle Control System>

(Configuration Example of Vehicle Control System to which Present Technology is Applied)

Figure 24:
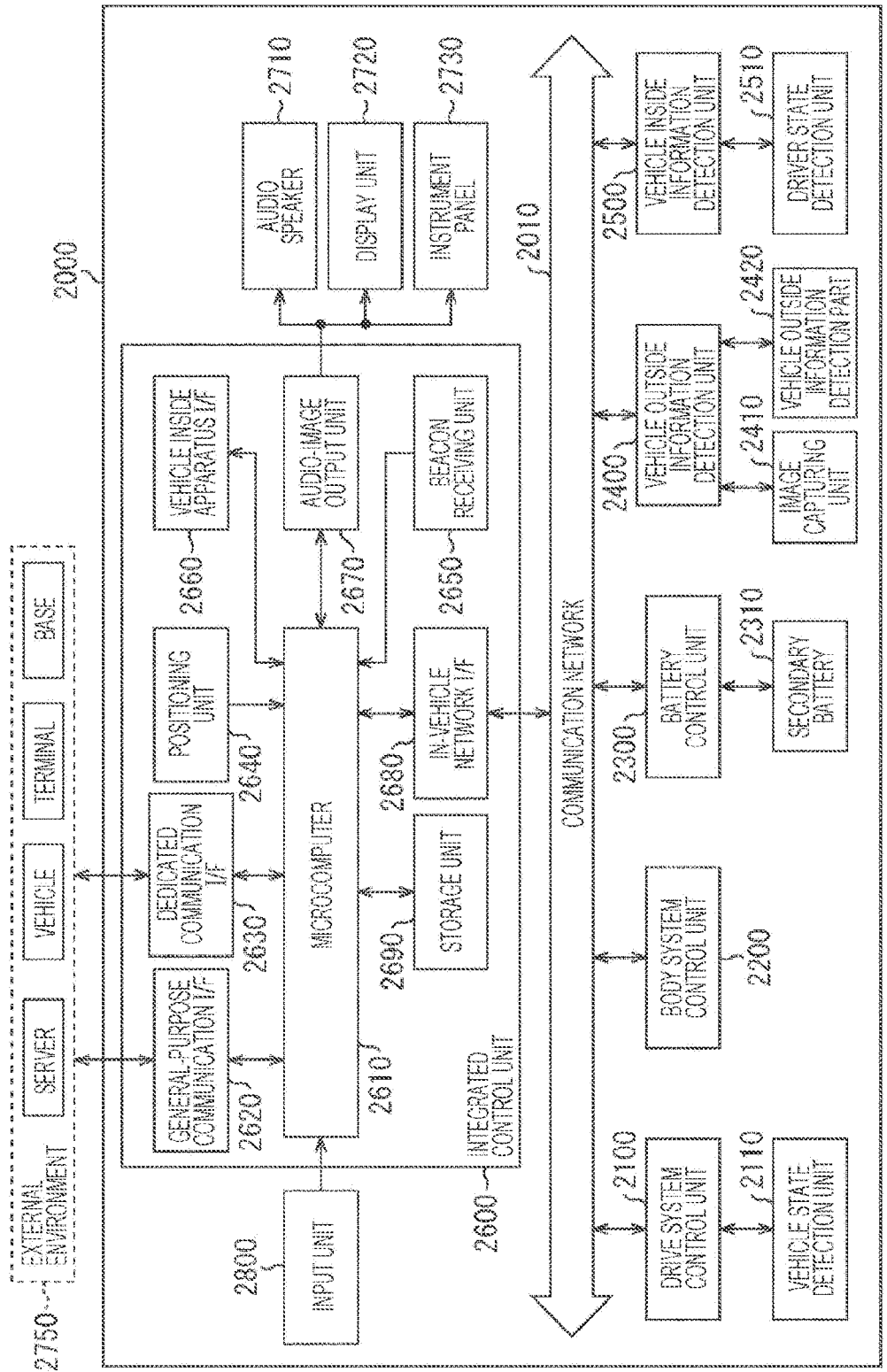
FIG. 24 is a block diagram schematically illustrating a configuration example of a vehicle control system.

FIG. 24 is a block diagram schematically illustrating a configuration example of a vehicle control system to which the present technology is applied.

The vehicle control system 2000 is provided with a plurality of electronic control units that are connected through the communication network 2010. In the example shown in FIG. 24, the vehicle control system 2000 is provided with the drive system control unit 2100, a body system control unit 2200, a battery control unit 2300, a vehicle outside information detection unit 2400, a vehicle inside information detection unit 2500, and an integrated control unit 2600. The communication network 2010 that connects the plurality of control units may be, for example, an in-vehicle communication network in conformity with arbitrary standards such as Controller Area Network (CAN), Local Interconnect Network (LIN), Local Area Network (LAN) or FlexRay (registered trademark).

Each control unit is provided with: a microcomputer that performs computation processing according to various kinds of programs; a storage unit that stores a program executed by the microcomputer, or parameters or the like used for various kinds of computations; and a driving circuit that drives various kinds of devices to be controlled. The control units are each provided with: a network interface I/F used to perform communications with other control units through the communication network 2010; and a communication I/F used to perform communications with devices, sensors and the like inside and outside a vehicle by wired or wireless communication. As a functional configuration of the integrated control unit 2600, FIG. 24 illustrates a microcomputer 2610, a general-purpose communication I/F 2620, a dedicated communication I/F 2630, a positioning unit 2640, a beacon receiving unit 2650, a vehicle inside apparatus I/F 2660, an audio-image output unit 2670, an in-vehicle network I/F 2680, and a storage unit 2690. The other control units are also provided with a microcomputer, a communication I/F, a storage unit and the like in like manner.

The drive system control unit 2100 controls the operation of a device related to a drive system of the vehicle according to various kinds of programs. For example, the drive system control unit 2100 functions as a control device for: a driving force generator that generates the driving force of the vehicle, such as an internal combustion engine or a driving motor; a driving force transmission mechanism for transferring the driving force to a wheel; a steering mechanism for adjusting a rudder angle of the vehicle; a braking device that generates the braking force of the vehicle; and the like. The drive system control unit 2100 may be provided with a function as a control device such as an Antilock Brake System (ABS) or an Electronic Stability Control (ESC).

The vehicle state detection unit 2110 is connected to the drive system control unit 2100. The vehicle state detection unit 2110 includes at least one of, for example, a gyro sensor that detects an angular speed of shaft rotary motion of a vehicle body, an acceleration sensor that detects acceleration of the vehicle, and a sensor for detecting the operation amount of an accelerator pedal, the operation amount of a brake pedal, an steering angle of a steering wheel, an engine rotational frequency, a rotational speed of a wheel or the like. The drive system control unit 2100 performs computation processing by using a signal input from the vehicle state detection unit 2110, and controls an internal combustion engine, a driving motor, an electrically-driven power steering device, a brake device or the like.

The body system control unit 2200 controls the operation of various kinds of devices provided in the vehicle body according to various kinds of programs. For example, the body system control unit 2200 functions as a control device for a keyless entry system, a smart key system, a power window device, or a head lamp, a back lamp, a brake lamp, a blinker, or various kinds of lamps such as a fog lamp. In this case, an electrical wave transmitted from a portable device that is substituted for a key, or signals of various switches, can be input into the body system control unit 2200. The body system control unit 2200 accepts the input of the electrical wave or the signals, and controls a door lock device, a power window device, a lamp and the like of the vehicle.

The battery control unit 2300 controls a secondary battery 2310, which is an electric power supply source of the driving motor, according to various kinds of programs. For example, information including a battery temperature, a battery output voltage, a remaining capacity of a battery or the like is input into the battery control unit 2300 from a battery device provided with the secondary battery 2310. The battery control unit 2300 performs computation processing by using these signals, and performs the temperature adjustment control of the secondary battery 2310 or performs the control of a cooling device or the like that is provided in the battery device.

The vehicle outside information detection unit 2400 detects information of the outside of the vehicle equipped with the vehicle control system 2000. For example, at least one of the image capturing unit 2410 and the vehicle outside information detection part 2420 is connected to the vehicle outside information detection unit 2400. The image capturing unit 2410 includes at least one of a Time of Flight (ToF) camera, a stereo camera, a single-eyed camera, an infrared camera and other cameras. The vehicle outside information detection part 2420 includes, for example, an environment sensor for detecting current weather or atmospheric phenomena, or a surrounding information detection sensor for detecting other vehicles, obstacles or walkers surrounding the vehicle equipped with the vehicle control system 2000, and the like.

The environment sensor may be at least one from among, for example, a raindrop sensor for detecting rainy weather, a fog sensor for detecting a fog, a sunshine sensor for detecting a degree of sunshine, and a snow sensor for detecting a snow fall. The surrounding information detection sensor may be at least one from among an ultrasonic sensor, a radar device, and a Light Detection and Ranging, Laser Imaging Detection and Ranging (LIDAR) device. The image capturing unit 2410 and the vehicle outside information detection part 2420 may be provided as sensors or devices that are independent of each other, or may be provided as a device into which a plurality of sensors or devices are integrated.

Figure 25:
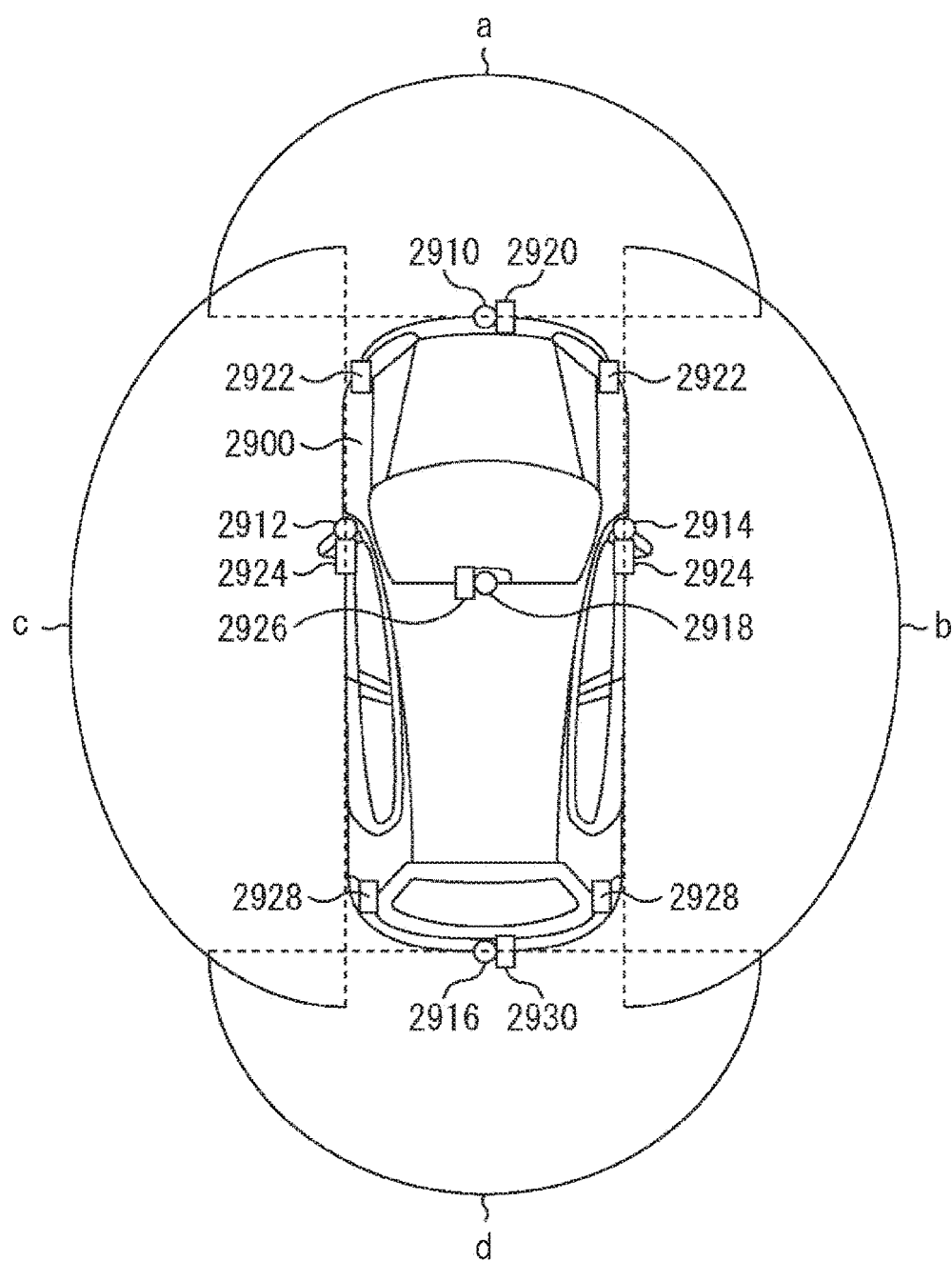
FIG. 25 is an explanatory drawing illustrating an example of positions at which a vehicle outside information detection part and an image capturing unit are provided.

Here, FIG. 25 shows, as an example, installation positions of the image capturing units 2410 and the vehicle outside information detection parts 2420. Each of image capturing units 2910, 2912, 2914, 2916, 2918 is provided at at least one position among, for example, a front nose, a side-view mirror, a rear bumper and a back door of a vehicle 2900, and an upper part of a windshield inside the vehicle room. The image capturing unit 2910 provided at the front nose, and the image capturing unit 2918 provided at the upper part of the windshield inside the vehicle room, mainly obtain an image viewed from the front of the vehicle 2900. The image capturing units 2912, 2914 provided at the side-view mirrors respectively mainly obtain images viewed from the sides of the vehicle 2900. The image capturing unit 2916 provided at the rear bumper or the back door mainly obtains an image viewed from the back of the vehicle 2900. The image capturing unit 2918 provided at the upper part of the windshield inside the vehicle room is mainly used to detect preceding vehicles, or walkers, obstacles, traffic lights, traffic signs, traffic lanes or the like.

Incidentally, FIG. 25 shows, as an example, imaging ranges of the respective image capturing units 2910, 2912, 2914, 2916. An image capturing range a indicates an image capturing range of the image capturing unit 2910 provided at the front nose; image capturing ranges c and b indicate image capturing ranges of the image capturing units 2912, 2914 provided at the side-view mirrors respectively; and an image capturing range d indicates an image capturing range of the image capturing unit 2916 provided at the rear bumper or the back door. Superimposing image data captured by, for example, the image capturing units 2910, 2912, 2914, 2916 enables to obtain a bird's-eye view image of the vehicle 2900 viewed from the upper part.

The vehicle outside information detection parts 2920, 2922, 2924, 2926, 2928, 2930 that are provided at the front, rear, sides and corners of the vehicle 2900 and at the upper part of the windshield inside the vehicle room may be, for example, ultrasonic sensors or radar devices. The vehicle outside information detection parts 2920, 2926, 2930 that are provided at the front nose, rear bumper and back door of the vehicle 2900 and at the upper part of the windshield inside the vehicle room may be, for example, LIDAR devices. These vehicle outside information detection parts 2920 to 2930 are mainly used to detect preceding vehicles, walkers, obstacles or the like.

Returning to FIG. 24 to continue the explanation. The vehicle outside information detection unit 2400 causes the image capturing unit 2410 to capture an image outside the vehicle, and receives captured image data. In addition, the vehicle outside information detection unit 2400 receives detection information from the connected vehicle outside information detection part 2420. In a case where the vehicle outside information detection part 2420 is an ultrasonic sensor, a radar device or a LIDAR device, the vehicle outside information detection unit 2400 emits an ultrasonic wave, an electromagnetic wave or the like, and receives information of a received reflected wave. The vehicle outside information detection unit 2400 may perform object detection processing or distance detection processing of a person, a car, an obstacle, a sign, characters on a road surface, or the like on the basis of the received information. The vehicle outside information detection unit 2400 may perform environment recognition processing that recognizes a rainfall, a fog, road-surface conditions, or the like on the basis of the received information. The vehicle outside information detection unit 2400 may calculate a distance to an object outside the vehicle on the basis of the received information.

In addition, the vehicle outside information detection unit 2400 may perform image recognition processing or distance detection processing that recognize persons, cars, obstacles, signs, characters on a road surface, or the like on the basis of received image data. The vehicle outside information detection unit 2400 performs processing of distortion correction, alignment or the like for the received image data, and may synthesize image data captured by a different image capturing unit 2410 to generate a bird's-eye view image or a panoramic image. The vehicle outside information detection unit 2400 may perform viewpoint conversion processing by using the image data captured by the different image capturing unit 2410.

The vehicle inside information detection unit 2500 detects information inside the vehicle. For example, a driver state detection unit 2510 that detects a state of a driver is connected to the vehicle inside information detection unit 2500. The driver state detection unit 2510 may include a camera for image-capturing a driver, a living-body sensor that detects biological information of the driver, a microphone that collects sounds inside the vehicle room, or the like. The living-body sensor is provided on, for example, a seat surface, a steering wheel or the like, and detects biological information of a passenger who sits on a seat, and biological information of a driver who holds a steering wheel. On the basis of detection information input from the driver state detection unit 2510, the vehicle inside information detection unit 2500 may calculate a fatigue degree, or a concentration degree, of a driver, or may determine whether or not the driver is dozing. The vehicle inside information detection unit 2500 may subject a collected sound signal to noise cancelling processing or the like.

The integrated control unit 2600 controls the overall operation in the vehicle control system 2000 according to various kinds of programs. An input unit 2800 is connected to the integrated control unit 2600. The input unit 2800 is realized by a device that allows a passenger to perform input operation, the device including, for example, a touch panel, a button, a microphone, a switch, a lever, or the like. The input unit 2800 may be, for example, a remote control device that uses infrared rays or other electrical waves, or an external connection apparatus that supports the operation of the vehicle control system 2000, the external connection apparatus including a portable telephone, a Personal Digital Assistant (PDA), or the like. The input unit 2800 may be, for example, a camera. In this case, a passenger is allowed to input information by a gesture. Moreover, the input unit 2800 may include, for example, an input control circuit and the like that generates an input signal on the basis of information input by a passenger or the like using the input unit 2800, and that outputs the input signal to the integrated control unit 2600. By operating the input unit 2800, the passenger or the like is allowed to input various kinds of data into the vehicle control system 2000, and to instruct the vehicle control system 2000 to perform processing operation.

The storage unit 2690 may include a Random Access Memory (RAM) that stores various kinds of programs executed by the microcomputer, and a Read Only Memory (ROM) that stores various kinds of parameters, computation results, sensor values, or the like. In addition, the storage unit 2690 may be realized by a magnetic storage device such as a Hard Disc Drive (HDD), a semiconductor storage device, an optical storage device, a magneto-optical storage device, or the like.

The general-purpose communication I/F 2620 is a general-purpose communication I/F that interfaces communications with various apparatuses existing in an external environment 2750. The general-purpose communication I/F 2620 may be provided with: a cellular communication protocol such as Global System of Mobile communications (GSM) (registered trademark), Worldwide Interoperability for Microwave Access (WiMAX), and Long Term Evolution (LTE) (or LTE-A (LTE-Advanced)); or other wireless communication protocols such as a wireless LAN (also called Wi-Fi (registered trademark)). The general-purpose communication I/F 2620 may be connected to an apparatus (for example, an application server or a control server) that exists on an external network (for example, Internet, a cloud network, or a company-specific network) through, for example, a base station or an access point. In addition, the general-purpose communication I/F 2620 may be connected to a terminal (for example, a terminal possessed by a walker or a shop, or a Machine Type Communication (MTC) terminal) that exists in proximity to the vehicle by using, for example, Peer To Peer (P2P) technique.

The dedicated communication I/F 2630 is a communication I/F that supports a communication protocol developed for the purpose of using for vehicles. The dedicated communication I/F 2630 may be provided with standard protocols, for example, Wireless Access in Vehicle Environment (WAVE) that is a combination of IEEE802.11p that is a lower level layer and IEEE1609 that is an upper level layer, or Dedicated Short Range Communications (DSRC). Typically, the dedicated communication I/F 2630 carries out V2X communication that is a concept including one or more of Vehicle to Vehicle communication, Vehicle to Infrastructure communication, and Vehicle to Pedestrian communication.

The positioning unit 2640 receives, for example, a GNSS signal from a Global Navigation Satellite System (GNSS) satellite (for example, a GPS signal from a Global Positioning System (GPS) satellite) to execute positioning, and generates position information that includes latitude, longitude, and altitude of the vehicle. It should be noted that the positioning unit 2640 may identify a current position by exchanging a signal with a wireless access point, or may obtain position information from a terminal such as a portable telephone, a Personal Handy-phone System (PHS) or a smart phone, the terminal having a positioning function.

The beacon receiving unit 2650 receives an electrical wave or an electromagnetic wave transmitted from, for example, a wireless station or the like installed on the road, and obtains information related to a current position, traffic congestion, suspension of traffic, the required time or the like. It should be noted that the function of the beacon receiving unit 2650 may be included in the above-described dedicated communication I/F 2630.

The vehicle inside apparatus I/F 2660 is a communication interface that interfaces connections between the microcomputer 2610 and various apparatuses existing inside the vehicle. The vehicle inside apparatus I/F 2660 may establish a wireless connection by using a wireless communication protocol that is, for example, a wireless LAN, Bluetooth (registered trademark), Near Field Communication (NFC), or Wireless USB (WUSB). In addition, the vehicle inside apparatus I/F 2660 may establish a wired connection through an unillustrated connection terminal (and a cable if necessary). The vehicle inside apparatus I/F 2660 exchanges a control signal or a data signal with, for example, a mobile apparatus or a wearable apparatus possessed by a passenger, or an information apparatus that is carried into the vehicle or is mounted thereto.

The in-vehicle network I/F 2680 is an interface that interfaces communications between the microcomputer 2610 and the communication network 2010. The in-vehicle network I/F 2680 transmits and receives a signal or the like according to a predetermined protocol supported by the communication network 2010.

The microcomputer 2610 of the integrated control unit 2600 controls the vehicle control system 2000 according to various kinds of programs on the basis of information obtained through at least one of the general-purpose communication I/F 2620, the dedicated communication I/F 2630, the positioning unit 2640, the beacon receiving unit 2650, the vehicle inside apparatus I/F 2660, and the in-vehicle network I/F 2680. For example, the microcomputer 2610 may calculate a control target value of the driving force generator, the steering mechanism or the braking device on the basis of obtained information of the inside and outside of the vehicle, and output a control instruction to the drive system control unit 2100. For example, the microcomputer 2610 may be perform cooperative control for the purpose of collision avoidance or shock mitigation of the vehicle, follow-up traveling based on a distance between vehicles, vehicle-speed maintaining traveling, automated driving or the like.

The microcomputer 2610 may create local map information that includes surrounding information at a current position of the vehicle on the basis of information obtained through at least one of the general-purpose communication I/F 2620, the dedicated communication I/F 2630, the positioning unit 2640, the beacon receiving unit 2650, the vehicle inside apparatus I/F 2660, and the in-vehicle network I/F 2680. In addition, on the basis of the obtained information, the microcomputer 2610 may predict a risk that includes a collision of the vehicle, approaching of a walker or the like, driving into a road that is closed to traffic, or the like so as to generate a warning signal. The warning signal may be, for example, a signal for causing an alarm sound to be produced or for causing a warning lamp to light up.

The audio-image output unit 2670 transmits at least one of an audio output signal and an image output signal to an output device that is capable of visually or audibly notifying passengers of the vehicle or persons outside the vehicle of information. In the example in FIG. 24, an audio speaker 2710, a display unit 2720, and an instrument panel 2730 are presented as output devices. The display unit 2720 may include at least one of, for example, an on-board display and a head-up display. The display unit 2720 may have an Augmented Reality (AR) display function. Other than these devices, a head phone, a projector, a lamp or the like may be used as an output device. In a case where the output device is a display device, the display device visually displays the result obtained by various kinds of processing performed by the microcomputer 2610, or information received from other control units, in various formats such as a text, an image, a table and a graph. In addition, in a case where the output device is an audio output device, the audio output device converts an audio signal that includes reproduced audio data, acoustic data, or the like into an analog signal, and then audibly outputs the analog signal.

It should be noted that in the example shown in FIG. 24, at least two control units that are connected through the communication network 2010 may be unified as one control unit. Alternatively, an individual control unit may be configured by a plurality of control units. In addition, the vehicle control system 2000 may be provided with a different control unit that is not illustrated. Moreover, in the above explanation, a part or all of functions taken charge of by any of the control units may be taken charge of by another control unit. In other words, if information is transmitted and received through the communication network 2010, predetermined computation processing may be performed by any of the control units. Similarly, a sensor or a device that is connected to any of the control units may be connected to other control units, and a plurality of control units may mutually transmit and receive detection information through the communication network 2010.

In the vehicle control system 2000 configured as above, the integrated control unit 2600 is provided with the functions of the image processing device according to the present application. It should be noted that at least a part of the functions of the image processing device according to the present application may be realized by a module (for example, an integrated circuit module that includes one die) for the integrated control unit 2600. In addition, the image processing device according to the present application may be realized by a plurality of control units.

Incidentally, in the present description, the system means a set of a plurality of components (devices, modules (parts), etc.), and it does not matter whether or not all components are disposed in the same housing. Therefore, a plurality of devices that are accommodated in a separate housing, and that are connected through a network, and one device having one housing that accommodates a plurality of modules, are both systems.

In addition, embodiments of the present technology are not limited to the embodiments described above. Various modifications can be made within the scope that does not deviate from the gist of the present technology. For example, the present technology can be configured as cloud computing in which one function is processed by being shared by a plurality of devices in cooperation through a network.

Further, each step explained in the above-described flowchart is executed by one device. However, the each step can be executed by being shared by a plurality of devices. Furthermore, in a case where one step includes a plurality of processings, the plurality of processings included in the one step are executed by one device. However, the plurality of processings can be executed by being shared by a plurality of devices.

It should be noted that the present technology can employ the following configurations.

(1)

An information processing device including:

a required time calculation unit that calculates, for respective modes corresponding to parking methods of automatic parking that automatically parks a vehicle, respective required times until the automatic parking is completed; and a display control unit that controls displaying of the respective required times corresponding to the modes.

(2)

The information processing device set forth in (1), further including a mode determination unit that determines the mode according to user's operation.

(3)

The information processing device set forth in (1) or (2), in which the required time is a time from a start of the automatic parking until the automatic parking is completed.

(4)

The information processing device set forth in (3), in which the display control unit displays the required times for the respective modes, and the mode determination unit determines the mode according to a selection by the user.

(5)

The information processing device set forth in (3) or (4), in which the required time calculation unit calculates a required time for manual parking or a required time at the time of taking out corresponding to the mode, or a required time taken when priority is given to a specific requirement related to the automatic parking, and the display control unit displays the required time for manual parking or the required time at the time of taking out together with the required time for automatic parking, or displays the required time taken when priority is given to the specific requirement related to the automatic parking.

(6)

The information processing device set forth in (1) or (2), in which the required time is a time from a present point of time during the automatic parking until the automatic parking is completed.

(7)

The information processing device set forth in (6), further including a processing unit that identifies other modes corresponding to parking methods that can be executed at the present point of time during the automatic parking, in which the display control unit displays the other mode options together with the required times.

(8)

The information processing device set forth in (7), in which the mode determination unit determines the other mode according to a selection by the user.

(9)

The information processing device set forth in (7) or (8), in which the required time calculation unit calculates respective required times corresponding to the other modes, and the display control unit displays the required times corresponding to the other modes for the respective other modes.

(10)

An information processing method of an information processing device, the information processing method including the steps of:

for respective modes corresponding to parking methods of automatic parking that automatically parks a vehicle, calculating, by the information processing device, respective required times until the automatic parking is completed; and controlling displaying of the respective required times corresponding to the modes.

(11) A program causing a computer to function as:
a required time calculation unit that calculates, for respective modes corresponding to parking methods of automatic parking that automatically parks a vehicle, respective required times until the automatic parking is completed; and
a display control unit that controls displaying of the respective required times corresponding to the modes.

REFERENCE SIGNS LIST 1, 2, 3 Automatic parking system
10 Automatic parking control device
30 Information terminal device
11 Input device
12 Sensor
13 Display device
14 Vehicle device
100 Processing unit
101 Output unit
102 Storage unit
103 External I/F unit
104 Communication unit
111 Automatic parking determination unit
112 Required time calculation unit
113 Display control unit
114 Automatic parking mode determination unit
115 Function option processing unit
116 Learning unit
301 Communication unit
302 Display unit
1000 Computer
1001 CPU
2000 Vehicle control system

The invention claimed is:

1. An information processing device, comprising:
a central processing unit (CPU) configured to:
calculate a first plurality of required times for a plurality of automatic modes, wherein
each automatic mode of the plurality of automatic modes corresponds to an automatic parking operation of a vehicle,
each required time of the first plurality of required times corresponds to a respective automatic mode of the plurality of automatic modes, and
each required time of the first plurality of required times corresponds to a time required for completion of the automatic parking operation of the vehicle;
control a display screen to display each required time of the first plurality of required times with the respective automatic mode of the plurality of automatic modes,
wherein a first required time of the first plurality of required times corresponding to a first automatic mode of the plurality of automatic modes is different from a second required time of the first plurality of required times corresponding to a second automatic mode of the plurality of automatic modes;
determine the first automatic mode based on a user operation and the display of the each required time with the respective automatic mode; and
control the automatic parking operation of the vehicle based on the determined first automatic mode.

2. The information processing device according to claim 1, wherein each required time of the first plurality of required times is a time from a start of the automatic parking operation to the completion of the automatic parking operation.

3. The information processing device according to claim 2, wherein the CPU is further configured to:
calculate one of a required time for a manual parking operation of the vehicle, a required time for a taking out operation of the vehicle corresponding to the determined first automatic mode, or a required time taken for the automatic parking operation that is based on priority of a specific requirement related to the automatic parking operation; and
control the display screen to display the one of the required time for the manual parking operation, the required time for the taking out operation with the first required time of the first automatic mode for the automatic parking operation, or the required time taken for the automatic parking operation that is based on the priority of the specific requirement related to the automatic parking operation.

4. The information processing device according to claim 1, wherein each required time of the first plurality of required times is a time from a present point of time, during the automatic parking operation, to the completion of the automatic parking operation.

5. The information processing device according to claim 4, wherein the CPU is further configured to:
determine a plurality of specific modes, wherein each specific mode of the plurality of specific modes corresponds to a specific parking operation executable at the present point of time during the automatic parking operation; and
control the display screen to display the plurality of specific modes.

6. The information processing device according to claim 5, wherein the CPU is further configured to determine a specific mode of the plurality of specific modes based on a user selection.

7. The information processing device according to claim 6, wherein the CPU is further configured to:
calculate a second plurality of required times for the plurality of specific modes, wherein each required time of the second plurality of required times corresponds to a respective specific mode of the plurality of specific modes; and
control the display screen to display each required time of the second plurality of required times with the respective specific mode of the plurality of specific modes.

8. An information processing method, comprising:
calculate a plurality of required times for a plurality of automatic modes, wherein
each automatic mode of the plurality of automatic modes corresponds to an automatic parking operation of a vehicle,
each required time of the plurality of required times corresponds to a respective automatic mode of the plurality of automatic modes, and
each required time of the plurality of required times corresponds to a time required for completion of the automatic parking operation of the vehicle;
controlling a display screen to display each required time of the plurality of required times with the respective automatic mode of the plurality of automatic modes,
wherein a first required time of the plurality of required times corresponding to a first automatic mode of the plurality of automatic modes is different from a second required time of the plurality of required times corresponding to a second automatic mode of the plurality of automatic modes;

determining the first automatic mode based on a user operation and the display of the each required time with the respective automatic mode; and controlling the automatic parking operation of the vehicle based on the determined first automatic mode.

9. A non-transitory computer-readable medium having stored thereon computer-readable instructions, which when executed by an image processing device, cause the image processing device to execute operations, the operations comprising:

calculating a plurality of required times for a plurality of automatic modes, wherein each automatic mode of the plurality of automatic modes corresponds to an automatic parking operation of a vehicle, each required time of the plurality of required times corresponds to a respective automatic mode of the plurality of automatic modes, and each required time of the plurality of required times corresponds to a time required for completion of the automatic parking operation of the vehicle;

controlling a display screen to display each required time of the plurality of required times with the respective automatic mode of the plurality of automatic modes, wherein a first required time of the plurality of required times corresponding to a first automatic mode of the plurality of automatic modes is different from a second required time of the plurality of required times corresponding to a second automatic mode of the plurality of automatic modes;

determining the first automatic mode based on a user operation and the display of the each required time with the respective automatic mode; and controlling the automatic parking operation of the vehicle based on the determined first automatic mode.

* * * * *